(12) United States Patent
Kriese et al.

(10) Patent No.: US 9,566,846 B2
(45) Date of Patent: Feb. 14, 2017

(54) MOTOR VEHICLE WINDOW LIFTER

(71) Applicant: BROSE FAHRZEUGTEILE GMBH & CO. KG, HALLSTADT, Hallstadt (DE)

(72) Inventors: Olaf Kriese, Coburg (DE); Markus Schultz, Nuremberg (DE); Thomas Salhoff, Hallstadt (DE); Raimund Aschmutat, Grub am Forst (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/550,456

(22) Filed: Nov. 21, 2014

(65) Prior Publication Data

US 2015/0075081 A1 Mar. 19, 2015

Related U.S. Application Data

(63) Continuation of application No. 13/807,579, filed as application No. PCT/EP2011/060240 on Jun. 20, 2011, now abandoned.

(30) Foreign Application Priority Data

Jul. 6, 2010 (DE) .................. 10-2010-031-013

(51) Int. Cl.
*B60J 1/17* (2006.01)
*E05F 11/06* (2006.01)
(Continued)

(52) U.S. Cl.
CPC *B60J 1/17* (2013.01); *B60J 1/005* (2013.01); *B60J 1/007* (2013.01); *B60J 5/0416* (2013.01);
(Continued)

(58) Field of Classification Search
CPC .......... E05Y 2900/55; E05Y 2201/684; E05Y 2201/612; E05F 11/382; E05F 11/486; E05F 11/483; E05F 11/689; E05F 11/385; E05F 11/488; B60J 5/0416
(Continued)

(56) References Cited

U.S. PATENT DOCUMENTS 4,589,227 A 5/1986 Bickerstaff
4,633,613 A 1/1987 Kobayashi et al.
(Continued)

FOREIGN PATENT DOCUMENTS

CN 1827998 A 9/2006
DE 195 28 467 A1 2/1997
(Continued)

OTHER PUBLICATIONS

International Search Report of corresponding PCT/EP2011/060240, dated Feb. 3, 2010, 11 pages.
(Continued)

*Primary Examiner* — Justin Rephann
(74) *Attorney, Agent, or Firm* — Lewis Roca Rothgerber Christie LLP

(57) ABSTRACT

A motor vehicle window lifter is provided with a twistable or bendable guide rail on which a driver to be coupled with a window pane is shiftably mounted and which includes fastening points which are connectable with fastening receptacles of a carrier element. Between the fastening receptacles of the carrier element at least one supporting point is provided. When bracing the fastening points of the guide rail with the fastening receptacles of the carrier element, the guide rail supports on the supporting point and twisting of the initially straight guide rail with a specified degree of twisting and/or bending of the guide rail with a specified bending radius is effected.

10 Claims, 33 Drawing Sheets

(51) Int. Cl.
  *E05F 11/48* (2006.01)
  *B60J 5/04* (2006.01)
  *B60J 1/00* (2006.01)
  *E06B 3/44* (2006.01)
  *E05F 15/689* (2015.01)

(52) U.S. Cl.
  CPC .............. *B60J 5/0468* (2013.01); *E05F 11/06* (2013.01); *E05F 11/481* (2013.01); *E05F 11/488* (2013.01); *E05F 15/689* (2015.01); *E06B 3/44* (2013.01); *E05Y 2201/668* (2013.01); *E05Y 2201/684* (2013.01); *E05Y 2201/706* (2013.01); *E05Y 2800/266* (2013.01); *E05Y 2800/342* (2013.01); *E05Y 2800/676* (2013.01); *E05Y 2900/55* (2013.01)

(58) Field of Classification Search
  USPC .................................. 49/348, 349, 352, 502
  See application file for complete search history.

(56) References Cited

U.S. PATENT DOCUMENTS

| | | |
|---|---|---|
| 4,658,546 A | 4/1987 | Moriyama |
| 5,018,305 A | 5/1991 | Kuki et al. |
| 5,946,860 A | 9/1999 | Weber et al. |
| 5,970,658 A | 10/1999 | Smith |
| 6,006,473 A | 12/1999 | Mariel et al. |
| 6,052,947 A | 4/2000 | Smith |
| 6,115,966 A | 9/2000 | Shibata |
| 6,425,204 B1 | 7/2002 | Renner |
| 6,594,955 B1 | 7/2003 | Delire et al. |
| 6,604,325 B2 | 8/2003 | Nicolai et al. |
| 6,874,279 B1 | 4/2005 | Weber et al. |
| 6,938,374 B2 | 9/2005 | Yamamoto et al. |
| 7,047,692 B2 | 5/2006 | Benoit et al. |
| 7,124,541 B2 | 10/2006 | Fellner |
| 7,617,633 B2 | 11/2009 | Shimura et al. |
| 7,631,458 B2 | 12/2009 | Moriyama et al. |
| 8,510,997 B2 | 8/2013 | Nakamori et al. |
| 8,595,978 B2 | 12/2013 | Rietdijk |
| 2002/0046498 A1 | 4/2002 | Cardine |
| 2004/0045221 A1 | 3/2004 | Oberheide et al. |
| 2004/0194391 A1 | 10/2004 | Castellon |
| 2006/0196122 A1 | 9/2006 | Urieta et al. |
| 2007/0101658 A1 | 5/2007 | Heyer |
| 2007/0119102 A1 | 5/2007 | Seibert |
| 2008/0222962 A1 | 9/2008 | Staser et al. |
| 2011/0023367 A1 | 2/2011 | Barr et al. |
| 2011/0107676 A1 | 5/2011 | Rietdijk |

FOREIGN PATENT DOCUMENTS

| | | |
|---|---|---|
| DE | 199 42 643 A1 | 3/2001 |
| DE | 699 23 646 T2 | 4/2006 |
| DE | 20 2006011 177 U1 | 11/2006 |
| DE | 20 2006 019 563 U1 | 6/2008 |
| DE | 20 2008 014 665 U1 | 12/2009 |
| DE | 10 2008 058 906 A1 | 5/2010 |
| DE | 10 2008 059 166 A1 | 5/2010 |
| EP | 1 010 557 A1 | 6/2000 |
| EP | 1 129 873 A2 | 9/2001 |
| EP | 1 488 944 A1 | 12/2004 |
| EP | 1 698 503 A1 | 9/2006 |
| WO | WO 03/045736 A2 | 6/2003 |

OTHER PUBLICATIONS

English Translation of the International Preliminary Report on Patentability for International Application No. PCT/EP2011/060240, Jan. 17, 2013, 13 pages.

Chinese Search Report and English translation for Application No. CN201180033544.2, dated Jan. 14, 2015, 13 pages.

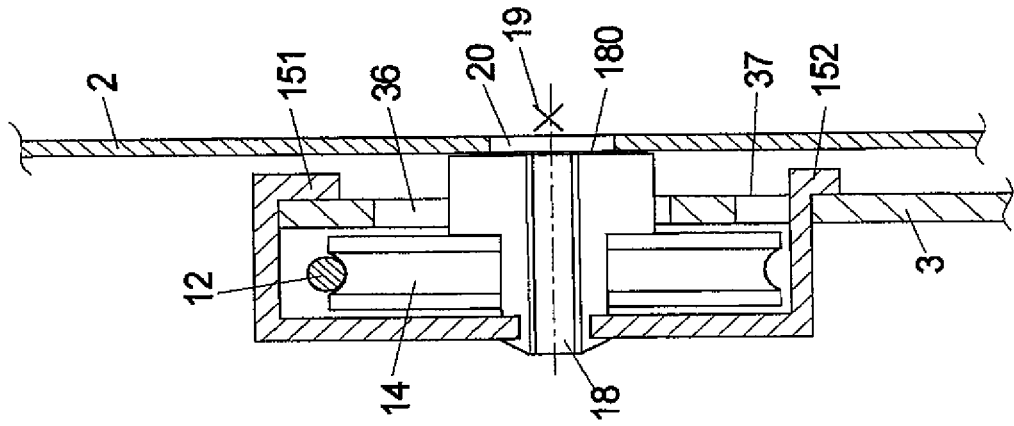
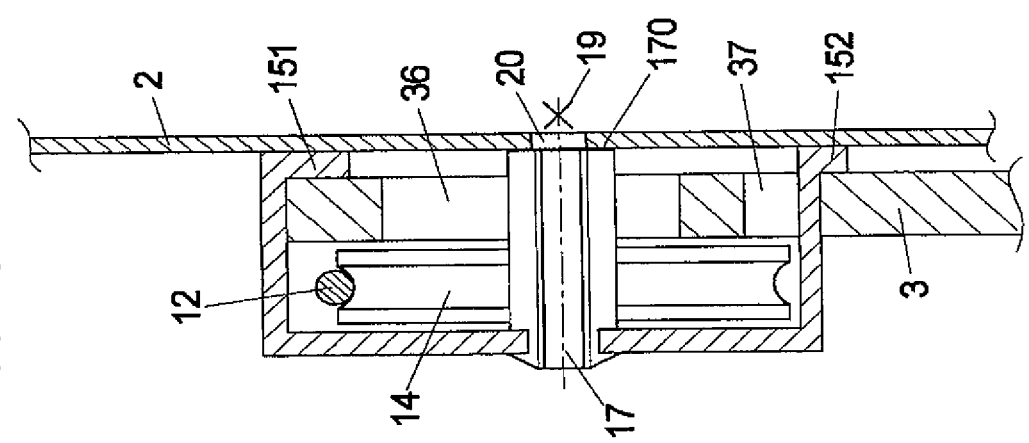
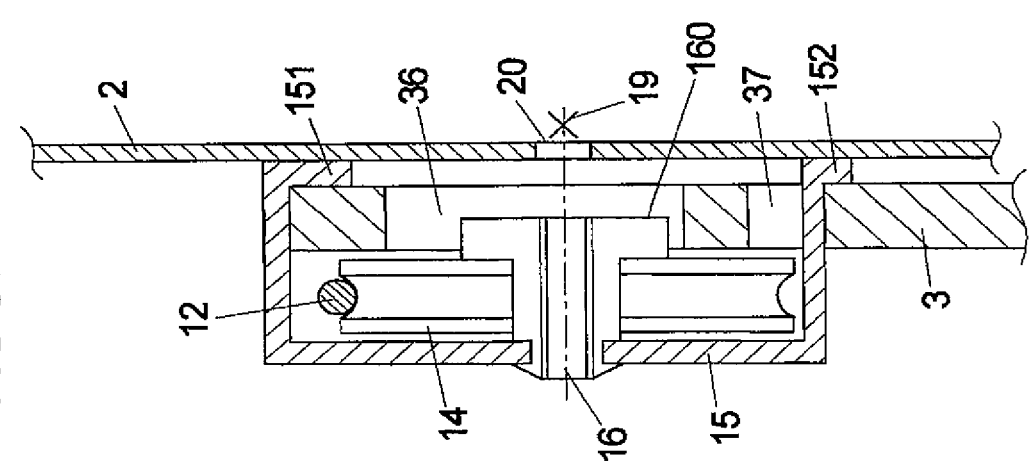

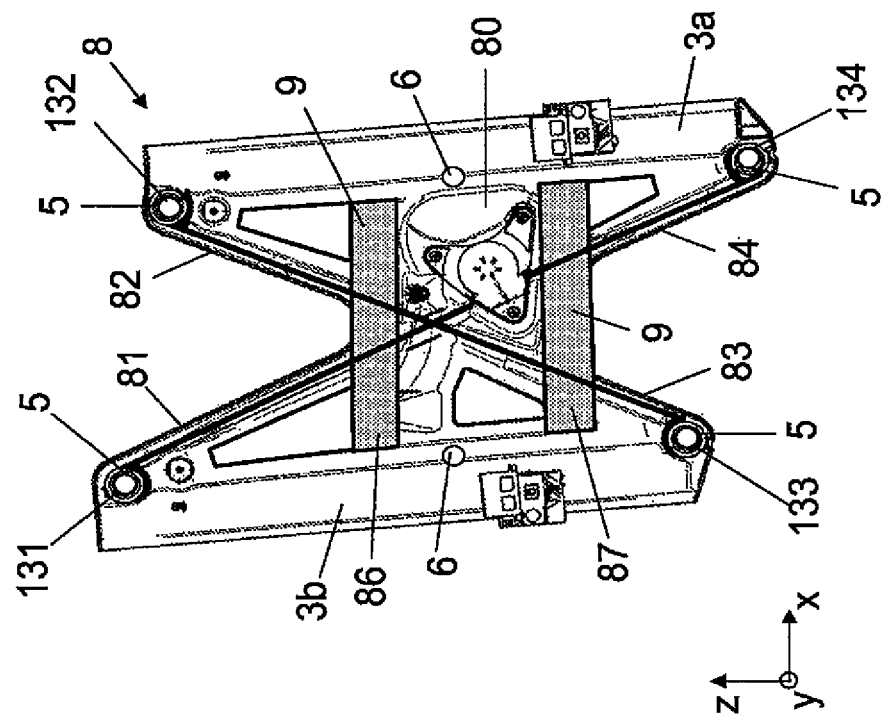

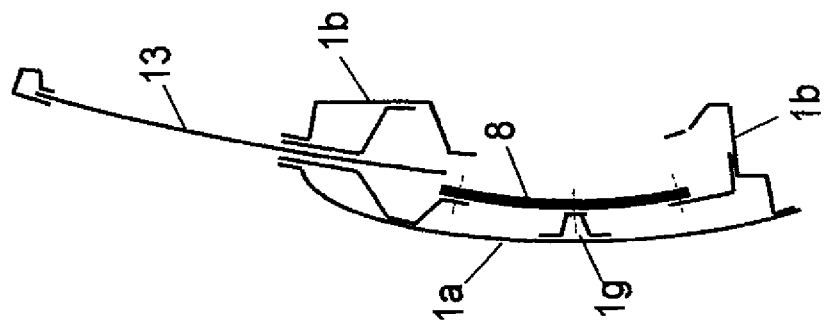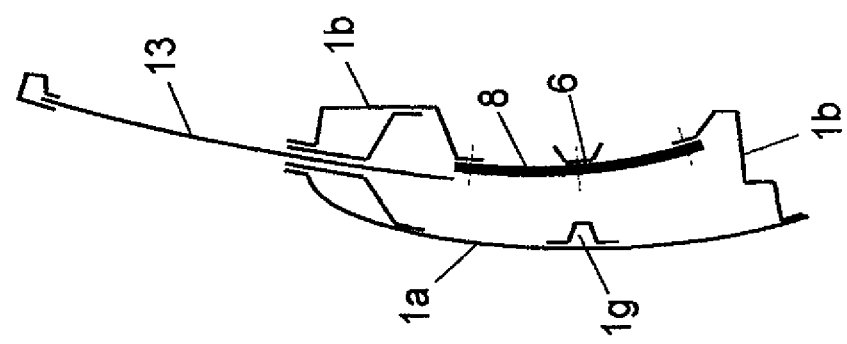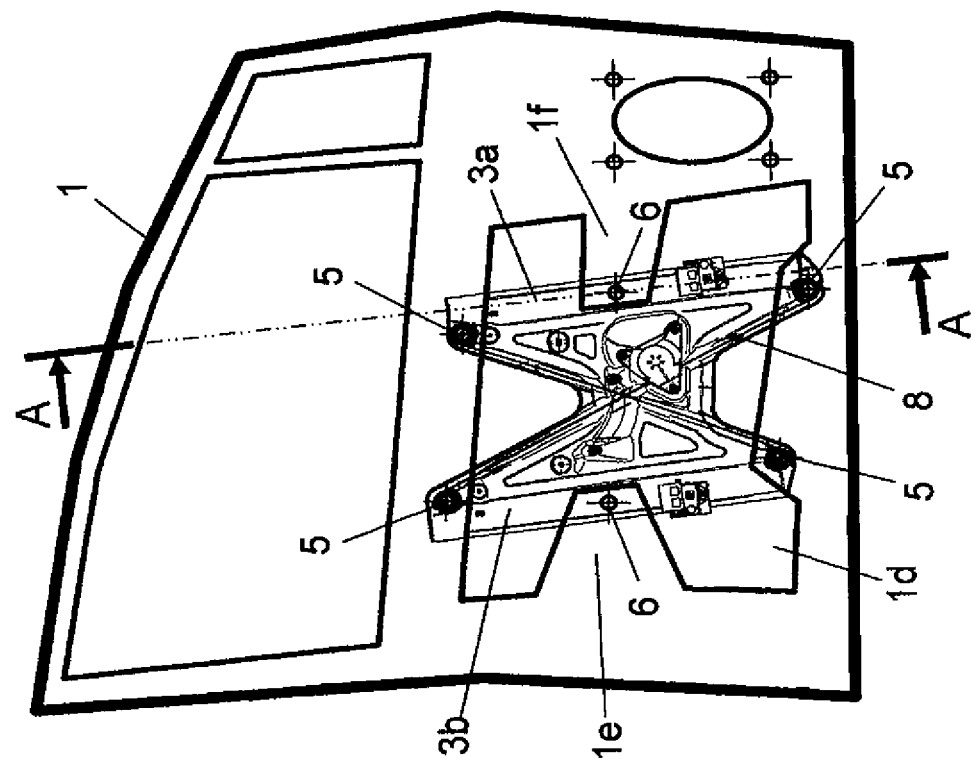

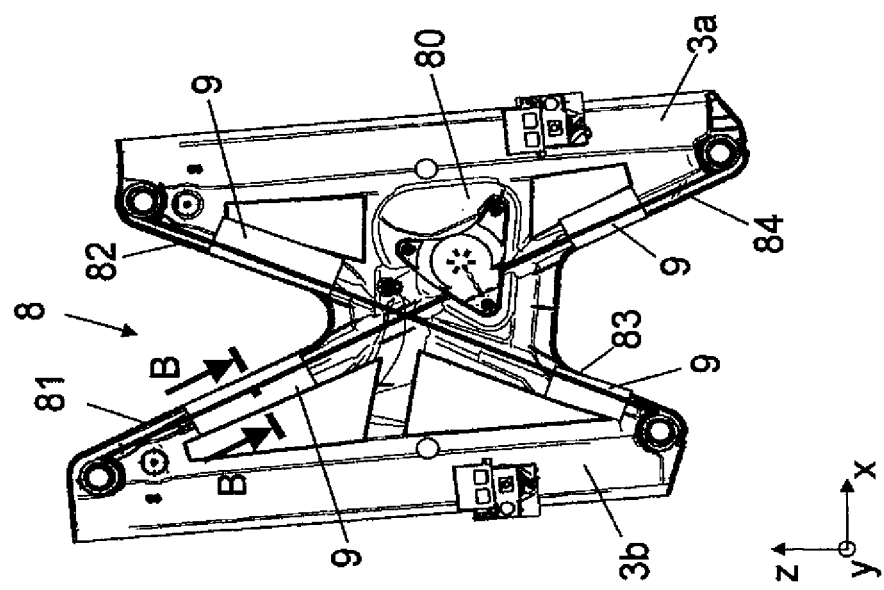

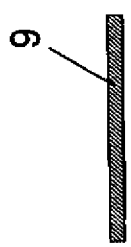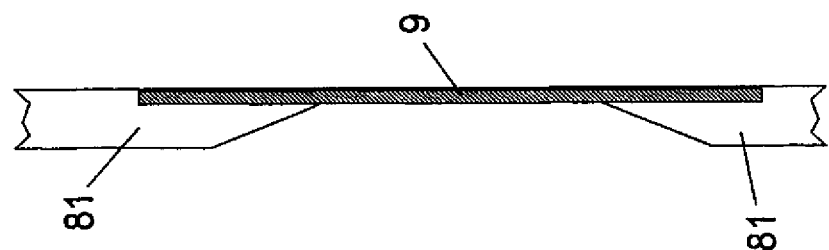

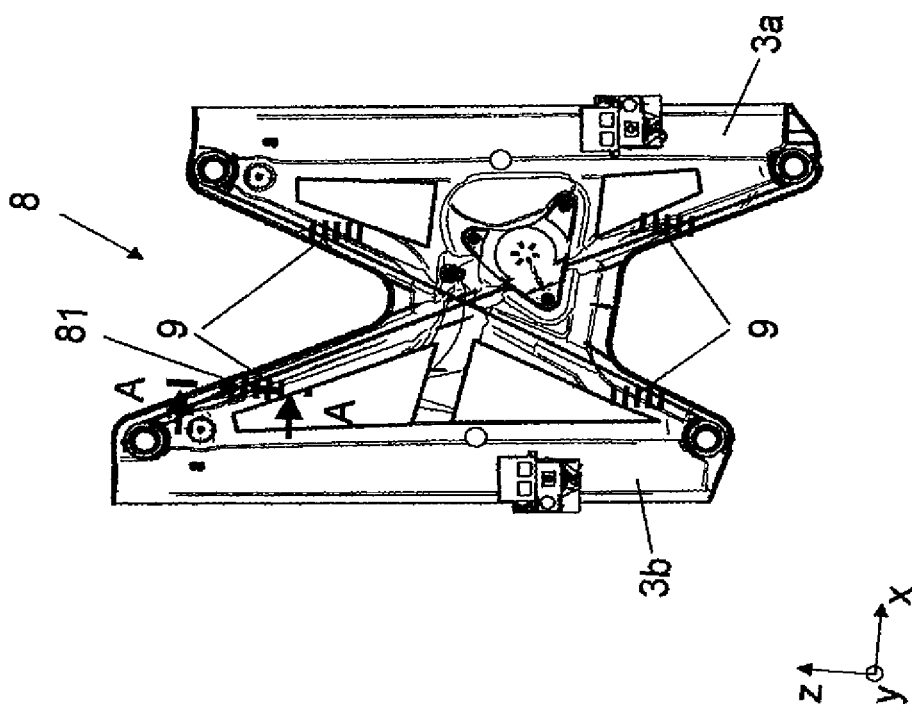

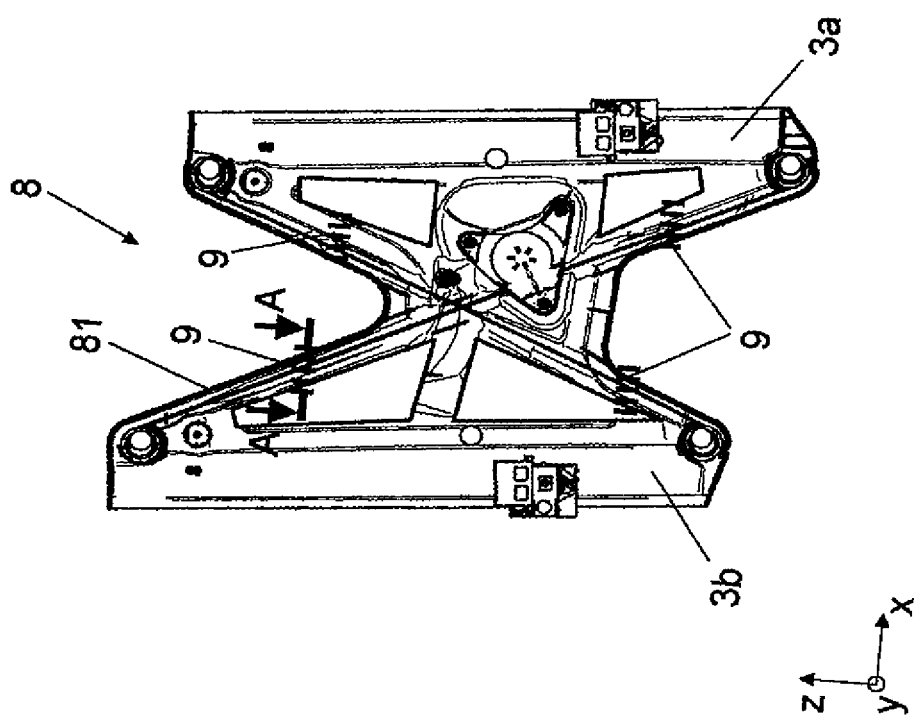

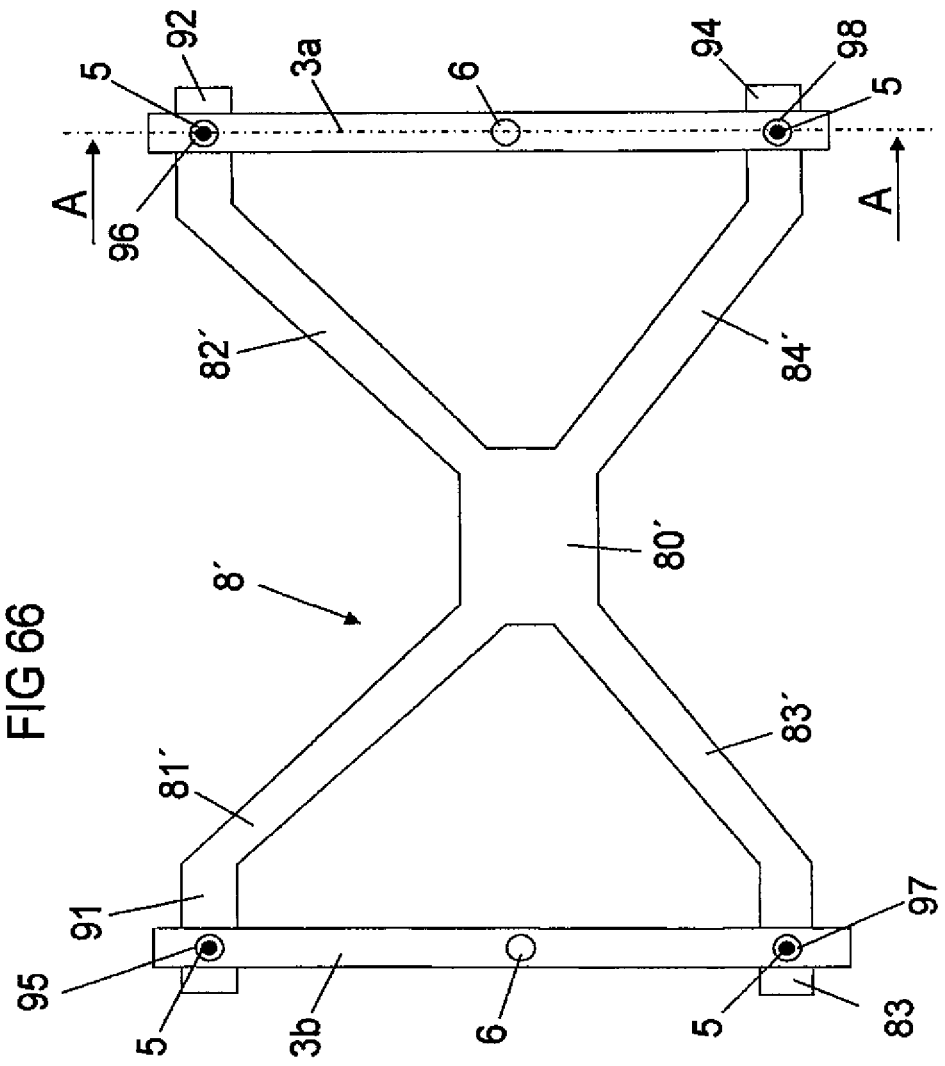
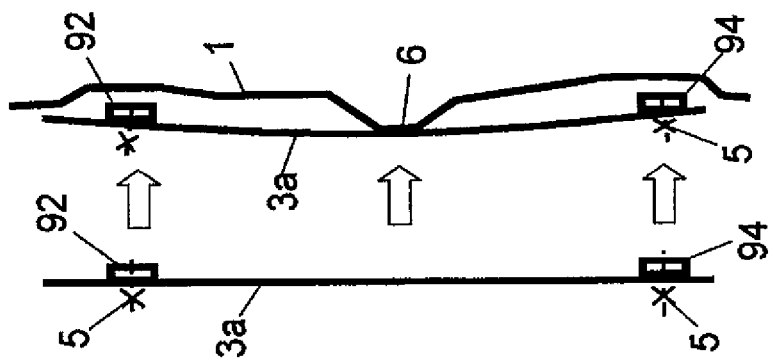

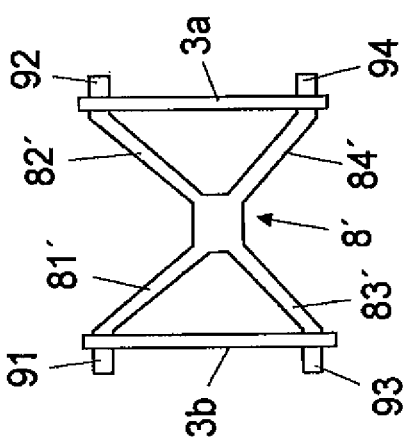
FIG 68 / FIG 69
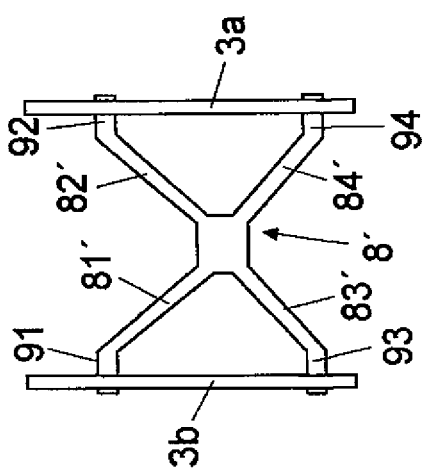
FIG 70

MOTOR VEHICLE WINDOW LIFTER

CROSS-REFERENCE TO A RELATED APPLICATION

This application is a continuation of application Ser. No. 13/807,579, filed on Dec. 28, 2012, which is a National Phase Patent Application of International Application Number PCT/EP2011/060240, filed on Jun. 20, 2011, which claims priority of German Patent Application Number 10 2010 031 013 0.1, filed on Jul. 6, 2010, the contents of which are hereby incorporated by reference in their entirety.

BACKGROUND

This invention relates to a motor vehicle window lifter with a twistable or bendable guide rail and to several methods for attaching a twistable or bendable guide rail to at least one carrier, which are formed according to at least one of the apparatus claims.

From DE 199 42 643 C2, there is known a method for attaching a cable window lifter to a vehicle door as well as the vehicle door of a motor vehicle, which contains a cable window lifter with a twistable or bendable guide rail which shiftably supports a driver to be coupled with a window pane and at its ends includes fastening points which are braced with fastening points of the vehicle door. By bracing the fastening points of the guide rail with the fastening points of the vehicle door, twisting of the initially straight guide rail with a specified degree of twisting and/or bending of the guide rail with a specified bending radius is effected. The fastening points of the vehicle door lie in planes which intersect each other such that they include an obtuse angle with each other, with the sectional lines of the planes extending vertically or parallel to the direction of travel of the motor vehicle, i.e. in direction of the Z-axis or X-axis.

Since the degree of twisting and/or the bending radius of the guide rail required for guiding a window pane solely is achieved by the bracing of the fastening points, the twist and/or bend of the guide rail of a window lifter, which is arranged in a door gutter of the vehicle door, need not be accomplished before mounting the guide rail on the vehicle door or on a carrier mounted on the vehicle door. Thus, the guide rail no longer must be twisted or bent during press forming, but the straight guide rail, which can simply and easily be manufactured for example by extruding or roller burnishing, is only twisted and/or bent by bracing the fastening points of the guide rail with the fastening points of the vehicle door, which provides for an inexpensive manufacture and assembly of a window lifter into a vehicle door.

Beside a use of individual guide rails in a window lifter mounted in a vehicle door, there are also used door systems or door modules which contain an assembly carrier on which functional components, for example a window lifter unit, a loudspeaker, a side airbag, a door lock arrangement or the like are arranged, or a base plate for a window lifter unit, in order to create a pre-mountable, pre-checkable unit which can easily be mounted on a vehicle door. As parts of a window lifter unit, the base plate or the assembly carrier carries at least one guide rail, on which a driver connected with a window pane is guided.

Such door systems or door modules are used in all kinds of designs in different vehicles and vehicle types of a vehicle manufacturer, wherein each variant of a vehicle type necessitates a specific, individual formation of the door system or window lifter, because the vehicle doors of the different variants and vehicle types are formed differently and differ in their constructive design and configuration. In different vehicle doors, for example, window panes with different kinematics, i.e. different radii of curvature, different pull-off angles (which indicate whether a window pane is retracted into a vehicle door almost vertically or obliquely) and different adjustment paths including rotations about individual or several vehicle axes (X-, Y and Z-axis), are used and require a specific adaptation of the guide rails or of the guide rails integrated into a base plate or of the guide portions formed on an assembly carrier. For this purpose, individual guide rails or guide rails integrated into an assembly carrier or a base plate, which are formed as guide portions, for example are bent about the longitudinal vehicle axis (X-axis) and/or twisted about the vertical vehicle axis (Z-axis) when they are mounted in a vehicle door.

SUMMARY

It is the object underlying the present invention to provide a motor vehicle window lifter or a door system for a vehicle door with a base plate with guide rails integrated therein, which expands the possibilities of twisting and/or bending at least one guide rail possibly integrated into a base plate or into an assembly carrier and hence the use of guide rails or base plates or assembly carriers with guide rails integrated therein for different vehicle doors and window lifter kinematics.

Due to the arrangement of at least one supporting point between the fastening receptacles of the carrier element, on which the guide rail supports when bracing the guide rail with the carrier element, the possibilities of twisting and/or bending a guide rail of a window lifter are expanded and the spectrum of application and use of a window lifter with a twistable or bendable guide rail thereby is increased.

An essential advantage of determining the pull-off kinematics of a window lifter only during installation of a guide rail or an assembly carrier or a base plate with integrated guide rails into a carrier element or a vehicle door consists in that proceeding from easily and inexpensively manufacturable semifinished products the guide rails or the base plates with integrated guide rails can be adapted to the respective conditions of the vehicle door, namely as regards the required bending radius (pull-off line of the window pane) and/or the required twist of the guide rails. Thus, the invention allows the use of parts according to the invention for use across all model ranges.

Proceeding from the prior art according to DE 199 42 643 C2, the subject-matter of the present invention not only utilizes the ends or end regions of a straight guide rail as fastening points, which due to the connection with correspondingly aligned fastening receptacles of the carrier bend and/or twist the guide rail in a specifiable manner on bracing with the carrier, but due to the arrangement of at least one supporting point between the fastening receptacles of the carrier a measure is created which has a shaping effect on the curvature and/or twist of the guide rail during bracing of the guide rail with the carrier element. Here and in the following, "carrier element" is understood to be the door body of a vehicle door accommodating a window lifter, in particular a door inner panel, a carrier plate insertable into the door frame of a vehicle door or a function carrier for module doors or door systems. Furthermore, the term "supporting point" also includes a supporting region and hence not only a point- or line-shaped support, but also a planar support.

The arrangement of at least one further fastening and/or supporting point between the fastening receptacles of the carrier element provides for not only bending or twisting a substantially straight, in particular extruded or roller-burnished, guide rail when bracing the guide rail with the carrier element by supporting the guide rail on the supporting point and attaching the same to the fastening receptacles of the carrier element, but also bend up a guide rail pre-bent with a first bending radius to a second bending radius, which is greater than the first bending radius, by supporting and/or attaching the guide rail to the supporting point and attaching the same to the fastening receptacles of the carrier element, and/or twist the same in a specifiable manner.

As a result, one and the same guide rail can be used for different vehicles and vehicle types with different window capstans or window curvatures and different strokes by corresponding cutting-to-length of the extruded or roller-burnished guide rail. In addition, the use of the same guide rail for left and right front and rear doors of a vehicle is possible. For manufacturing the guide rail only one extrusion tool is required, whereby investments are saved.

By pre-bending a guide rail and possibly by arranging at least one further fastening point between the fastening points arranged in the end regions of the guide rail, between which and the further fastening point at least one supporting point each is arranged, complex configurations of the guide rail for example with different radii or twists in the longitudinal extension of the guide rail can also be realized with simple means.

Alternatively, a pre-bent guide rail can also be straightened by supporting the guide rail on the supporting point and attaching the same to the fastening receptacles of the carrier element, so that the guide rail for example is attached to the supporting point under pretension, in order to establish a non-positive or integral connection of the guide rail with the supporting point by gluing, welding or the like.

Furthermore, by arranging several supporting points between the fastening points arranged in the end regions of the guide rail several contact points can be provided, which correspond to the exact bend of the guide rail with a bending radius or several bending radii or twists.

By arranging more than two fastening points, the possibility of creating several connecting points and hence an increased stiffening and stabilization of the guide rail is given.

On a plastic carrier, different receiving positions for extruded or roller-burnished guide rails are created and by attaching the extruded guide rail to the carrier, the guide rail is brought into a constrained position and assumes a particular, defined curvature and twist.

The guide rail can be braced both with a carrier plate or a function carrier as carrier element and also directly with the vehicle door, in general with the door inner panel. A further design variant consists in providing at least one fastening receptacle on the vehicle door as carrier element and at least one fastening receptacle on a carrier plate to be connected with the vehicle door or a function carrier as carrier element, wherein the fastening receptacles of the carrier plate or the function carrier and the vehicle door correspond with corresponding fastening points of the guide rail.

Bracing the guide rail both with a carrier plate or a function carrier and with a vehicle door accommodating the carrier plate or the function carrier as carrier elements provides for pre-bending or pre-twisting the guide rail when bracing the same with the carrier plate or the function carrier, and for bracing the same to the final bending radius or the final twist when inserting and connecting the same with the vehicle door as carrier element.

In addition, it is possible to pre-position the guide rail by means of a hook-shaped fastening receptacle formed at the carrier element, which can be put through a fastening point of the guide rail formed as opening.

Alternatively, it hence is possible to provide a first bending radius of the guide rail pre-mounted on the carrier plate and generate a second bending radius when mounting the carrier plate in the door body with the guide rail pre-mounted on the carrier plate.

In this variant of the solution according to the invention, different bending radii or degrees of twisting thus can be generated and hence an adaptation of the guide rail also to complicated contours or paths of movement on pull-off of the window pane of the window lifter can be realized.

The type and shape of the fastening points of the guide rail and the fastening receptacle of the carrier element and of the supporting point or supporting points permits a multitude of variants which can be adapted to the respective requirements as to the shape, i.e. bend and/or twist, or bracing of the guide rail with the carrier element or the carrier elements.

For a preassembly of the guide rail on a carrier plate, a function carrier or assembly carrier as first carrier element and final assembly of the first carrier element connected with the guide rail into a vehicle door as second carrier element a connection is suitable in which a first fastening receptacle of the carrier element is formed as hook or pocket protruding from the carrier element, into which an end of the guide rail can be put, and a second fastening receptacle consists of a clip protruding from the carrier element, which engages behind the guide rail via an opening in the guide rail. The connection of the first carrier element with the guide rail pre-mounted thereon with the vehicle door as second carrier element can be effected in the usual way via a screw connection, wherein for sealing an opening provided in the door body a circumferential seal is provided between the edge of the carrier plate, the function or assembly carrier and the opening edge of the door body.

Due to this design of the fastening points, fastening receptacles and the supporting point between the first and second fastening receptacle, the guide rail is held in the preassembly position by putting the one end of the guide rail into the pocket of the carrier plate and by the clip connection and is fixed in X-, Y- and Z-direction and pre-bent to a first bending radius, while in the subsequent final assembly for example by connecting the other end of the guide rail with the bodyshell of the vehicle door a further bending radius is generated or a defined radius of the preferably extruded or roller-burnished guide rail is generated after attachment to the door bodyshell.

Alternatively, the fastening receptacles of the carrier element can consist of a carrier element hook protruding from the surface of the carrier element and a clip, and the fastening points of the guide rail can consist of a guide rail hook, which engages behind the carrier element hook, and a clip protrusion cooperating with the clip of the carrier element, wherein the connecting elements are formed such that after putting the guide rail hook into the carrier element hook the guide rail can be pivoted about the positive connection of the guide rail hook and the carrier element hook, until the clip protrusion of the guide rail snaps into the clip of the carrier element.

Due to this design of the connecting elements, a simple and functionally reliable connection of a guide rail with a carrier element is ensured on bending or twisting the guide rail, and the basis for an increased stability of the guide rail is given by the arrangement of supporting regions.

With the arrangement of a cutout in the surface of the carrier element facing the guide rail, a plug-in opening of the carrier element hook is created for receiving an elongated guide rail hook for a larger undercut and hence for an optimum stability.

Further variants of the connection of a guide rail with a carrier element for twisting and/or bending the guide rail by bracing the fastening points of the guide rail with the fastening receptacles of the carrier element with at least one supporting point between the fastening receptacles of the carrier element are:

forming at least one fastening receptacle of the carrier element and one fastening point of the guide rail and/or at least one supporting point of the carrier element as adhesive connection between the surfaces of the carrier element and the guide rail, preferably with
- at least one spacer arranged between the surfaces of the carrier element to be connected and the guide rail, which protrudes from the surface of the carrier element and/or the guide rail, to ensure a defined thickness of the adhesive layer for an optimum and durable adhesive connection, and/or
- depressions arranged laterally of the surfaces of the carrier element to be connected by the adhesive connection and the guide rail and/or at least one opening in the carrier element arranged in the region of the surfaces of the carrier element to be connected by the adhesive connection and the guide rail, into or through which excess, non-cured adhesive can flow off, a structuring of the surface of the carrier element by alternating elevations and depressions, so that between the surface of the guide rail and the elevations and depressions of the surface of the carrier element alternating spaces are formed for receiving adhesive, a formation of at least one fastening receptacle of the carrier element as clip connection, into which the lateral edges of the guide rail can be clipped, manufacturing the guide rail of an extruded plastic material permeable for laser radiation and the carrier element of a material absorbing laser radiation, or vice versa a guide rail of a material absorbing laser radiation and a carrier element of a plastic material permeable for laser radiation, wherein the guide rail is pre-bent and fixing elements protrude from the surface of the carrier element, which engage behind the edges of the pre-bent guide rail such that a part of the surface of the guide rail is brought in contact with a part of the surface of the carrier element, so that the adjacent surface portions of the guide rail and the carrier element are connectable with each other by laser welding, a formation of the at least one fastening point of the guide rail as clip, which can be clipped into a fastening receptacle of the carrier element formed as opening in the carrier element, forming a hook- or pocket-shaped stop on the surface of the carrier element for receiving a guide rail end and a mounting aid protruding from the surface of the carrier element for aligning the guide rail put into the hook- or pocket-shaped stop on the surface of the carrier element, a rectangular or trapezoidal depression with legs of the carrier element horizontally angled from the edge of the depression, to which a rectangular or trapezoidal depression of the guide rail is adapted, which with its side legs horizontally angled from the edge of the depression rests on the legs of the carrier element angled from the rectangular or trapezoidal depression, wherein the rigidity of the connection of the guide rail with the carrier element is increased by the sandwich construction, fastening receptacles of the carrier element and fastening points of the guide rail from mutually spaced rivet or screw connections or alternatively adhesive connections between the adjacent surfaces of the guide rail and the carrier element, structuring the bottom of the box-shaped profile of the carrier element, in order to create cavities which effect a high moment of resistance and hence a high mechanical stability, forming the guide rail as extruded plastic rail with an extruded fleece, fabric, paper, film inserted in a sandwich construction or with a metallic or non-metallic insert for improving the rigidity.

When connecting the guide rail with the carrier element, the following material combinations preferably are used:
plastic guide rail with a plastic carrier element
metallic guide rail with a metallic carrier element
metallic guide rail with a plastic carrier element
plastic guide rail with metallic carrier element As metallic materials steel, aluminum and magnesium preferably are used. A plastic guide rail or a plastic carrier element preferably consists of a thermoplastic and/or thermoset material, which are used with and without reinforcing materials or fillers, such as for example a glass-fiber reinforced thermoplastic material. Manufacturing a plastic guide rail is effected by extrusion, injection molding, deep drawing, blow molding or pressing, manufacturing a plastic carrier element is effected by injection molding, deep drawing, blow molding and pressing, manufacturing a metallic guide rail is effected by roller burnishing, press forming or extruding, and manufacturing a metallic carrier element is effected by press forming or die casting.

For increasing the stability, a cassette which accommodates a cable pulley holder or a cable pulley of a cable window lifter deflecting a window lifter cable, can be integrated into the connection of the guide rail with the carrier element, for example a door inner panel or a carrier plate or a function carrier. For this purpose, the cassette preferably includes two bearing surfaces forming a rear grip of the cassette on the guide rail, via which the cassette is connected with the guide rail, and by a cutout in the guide rail is connected with the cable pulley, a stepped pin with internal thread, on which the cable pulley is mounted, and with the carrier element, in that a screw put through an opening of the carrier element is screwed to the internal thread of the stepped pin.

The cassette either is supported on the carrier element and hence loaded via the bearing surfaces, or the bearing surfaces are spaced from the carrier element, while the bottom of the stepped pin with internal thread rests against the carrier element and thereby relieves the cassette.

As an alternative to the use of individual guide rails and their connection with a carrier element, there can also be used a door module or door system for a vehicle door with an assembly carrier or a window lifter base plate with at least one bendable and/or twistable guide rail integrated into the assembly carrier or the base plate for guiding a driver to be coupled with a window pane along an adjustment direction. By connecting the guide rail with a rigid region of the base plate or the assembly carrier via connecting portions, which include at least one flexible region, a twisting and/or bending of the guide rail is effected when connecting fastening points of the assembly carrier or the base plate with fastening receptacles of a vehicle door, in particular with the door bodyshell of the vehicle door.

This expansion of the solution according to the invention for individual guide rails of a window lifter to base plates (or assembly carriers) with at least one guide rail integrated into the base plate thus also provides for twisting or bending the guide rail when mounting the base plate in the door bodyshell of a vehicle door and hence for using a base plate for different vehicles and vehicle types of different vehicle manufacturers as well as for a compensation of tolerances when mounting the base plate in the door bodyshell of the vehicle door or a compensation of manufacturing inaccuracies.

Preferably, the base plate and the guide rail are made such that the guide rail is bendable about the longitudinal vehicle axis (X-axis) and twistable about the vertical vehicle axis (Z-axis).

Due to this deformability of a base plate or a guide rail, there are also realized complicated adjustment paths or adjustment directions during pull-off of a window pane, in particular during pull-off of barrel-shaped window panes. When using two guide rails arranged at the lateral edges of a base plate, the rigid region of the base plate preferably is arranged between the guide rails, while the fastening points are provided at the ends of the guide rails and at least one supporting or further fastening point is provided between the end-side fastening points of the guide rails.

This first embodiment of a flexible base plate provides for a relatively stiff design of the guide rails without impairing the possibility of bending and/or twisting the guide rails for realizing different pull-off kinematics when connecting the base plate with the door bodyshell of a vehicle door.

In a second embodiment, the base plate alternatively includes two guide rails whose middle regions are connected with each other via a rigid cross-beam at whose ends fastening points are arranged, which are connected with the door bodyshell of a vehicle door, so that the ends of the guide rails are without connection to the rigid cross-beam and a flexibility of the guide rail legs hence is obtained.

Preferably, the fastening points are at least partly arranged on the axles of deflection pulleys of the window lifter for guiding and deflecting a window lifter cable.

By integrating fastening points into the axles of deflection pulleys of the window lifter, the possibilities of mounting a base plate into the door bodyshell of a vehicle door are expanded, in that for example an opening in the door inner panel of a vehicle door is covered, which has such a size that the connection of the base plate with the door bodyshell only is possible at the outer ends.

For optimization and simplification of the mounting of a base plate into the door bodyshell of a vehicle door, components integrated into the door bodyshell of the vehicle door such as crash barriers can also be used as supporting points.

In a preferred embodiment, the connecting portions of the base plate are formed as struts which are connected with the ends and a middle portion of the guide rails.

The formation of the connecting portions as struts, in particular as diagonal and transverse struts, instead of a full-surface formation of the connection of the rigid middle region of the base plate with the guide rails on the one hand creates a saving of material and on the other hand the prerequisite for a selective arrangement of flexible regions in the struts, in order to achieve a defined flexibility for bending and/or twisting the guide rails.

The flexibility required for bending and/or twisting the guide rails can be achieved in that the diagonal struts connected with the ends of the guide rails or the transverse struts connected with the middle portions of the guide rail contain the flexible regions.

While the arrangement of the flexible regions in the diagonal struts ensures a high flexibility in the end regions of the guide rails, the arrangement of flexible regions in the transverse struts provides for a high flexibility of the guide rail in the middle region with a relatively rigid formation of the end regions of the guide rails.

The flexible regions can be manufactured in different ways, namely a) by reducing the cross-section of the flexible region as compared to the cross-section of a rigid region of the connecting portions or struts, i.e. by thinning out the material in the flexible region, b) by a flat design of the flexible regions or by use of one of the connecting portions or struts, c) by a combination of the two variants a) and b), in that the flexibility is accomplished by thinning out the material and by a flat design of the flexible regions or by use of cross-sections with low moments of resistance, d) by using the 2-component technique, in which the rigid region is made of a rigid material, in particular of a long glass fiber-reinforced plastic material, and the flexible region is made of a flexible material, in particular a thermoplastic elastomer (TPE) or a material with lower modulus of elasticity, in particular of non-reinforced polypropylene, e) by a combination of the variants b) and d), in that rigid regions of a cross-sectional shape with a high moment of resistance are combined with a rigid material, and flexible regions with a cross-sectional shape with a lower moment of resistance than the cross-sectional shape of the rigid region are combined with a flexible material, f) by a combination of the variants a), b) and d), i.e. by the combination of a reduction in cross-section with a flat design and use of a flexible material for the flexible regions and by the combination of an enlarged cross-section with a high moment of resistance and use of a rigid material for the rigid regions, g) establishing the flexibility by the spring action of a wave-like structure of the connecting portions or struts, wherein the wave-like structure can be provided
in longitudinal direction of the connecting portions,
in direction of the vertical vehicle axis (Z-axis),
in direction of the longitudinal vehicle axis (X-axis), or
in several regions both in direction of the vertical vehicle axis (Z-axis) and in direction of the longitudinal vehicle axis (X-axis).

To further increase the possibilities of using the design of a base plate according to the invention with integrated guide rails for different vehicles and vehicle types of different vehicle manufacturers, the base plate is formed as mounting frame with connecting portions on whose end regions articulations are arranged for accommodating guide rails for different window lifters, window lifter types and/or vehicle doors, wherein the mounting frame preferably is formed X-shaped with a rigid, middle region and four diagonal struts each extending diagonally from the rigid middle region, whose ends are angled and include variable articulations for accommodating different guide rails.

BRIEF DESCRIPTION OF THE DRAWINGS

The exemplary embodiments illustrated in the drawing are meant to explain the invention and indicate various possibilities of realizing the solution according to the invention.

FIG. 1 shows a schematic longitudinal section through a straight, preferably extruded or roller-burnished guide rail and a carrier plate with two fastening receptacles and a supporting point arranged in between.

FIGS. 36-38 show three exemplary embodiments for screw-through solutions for increasing the stability when connecting a guide rail with a carrier element via a cassette and/or a stepped pin with internal thread.

FIG. 42 shows a schematic view of a base plate with rigid middle region and flexible regions in diagonal struts of the connecting portions.

FIG. 43 shows a schematic view of a base plate with rigid middle region and flexible regions in transverse struts of the connecting portions.

FIG. 48 shows a schematic side view of a vehicle door with a cutout in the door bodyshell and a base plate with integrated guide rails attached to the door bodyshell.

FIG. 49 shows a schematic longitudinal section through the vehicle door along the sectional line A-A of FIG. 48 with internal base plate.

FIG. 50 shows a schematic longitudinal section through the vehicle door along the sectional line A-A of FIG. 48 with external base plate.

FIG. 56 shows a schematic view of a base plate with rigid middle region and flexible regions in diagonal struts of the connecting portions corresponding to FIG. 42.

FIG. 57 shows a section through a diagonal strut along sectional line B-B of FIG. 56.

FIG. 59 shows a combination of the variants as shown in FIGS. 55, 57 and 58 for manufacturing a flexible region in a diagonal strut in a section along the sectional line A-A of FIG. 54.

FIG. 60 shows a combination of the variants as shown in FIGS. 55, 57 and 58 for manufacturing a flexible region in a diagonal strut in a section along the sectional line B-B of FIG. 56.

FIG. 63 shows a schematic view of a base plate with integrated guide rails with a wave-like structure for a flexible region for bending the guide rails about the longitudinal vehicle axis.

FIG. 64 shows a schematic view of a base plate with integrated guide rails with a wave-like structure for a flexible region for bending the guide rails about the vertical vehicle axis.

FIG. 66 shows a schematic view of a mounting frame with integrated, variable guide rails for use across all model ranges according to the modular design principle.

FIG. 67 shows a section along the sectional line A-A of FIG. 66 for explaining the function principle of the mounting frame with integrated, variable guide rails as shown in FIG. 66.

FIGS. 68-70 show schematic representations in use of the mounting frame of FIG. 66 for different vehicles or vehicle doors.

DETAILED DESCRIPTION

In the following description of various exemplary embodiments of the solution according to the invention the term "carrier element" refers to a carrier plate, a function or assembly carrier or the door bodyshell of a vehicle door. The terms "fastening point" and "supporting point" also include fastening regions and supporting regions, i.e. not only point- or line-shaped connections of a guide rail with a carrier element or bearing surfaces of a guide rail on a carrier element, but also flat connections and bearing surfaces.

Figure 1:
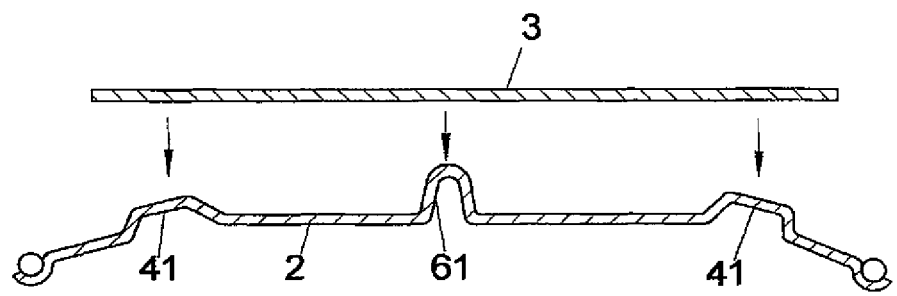
Figure 2:
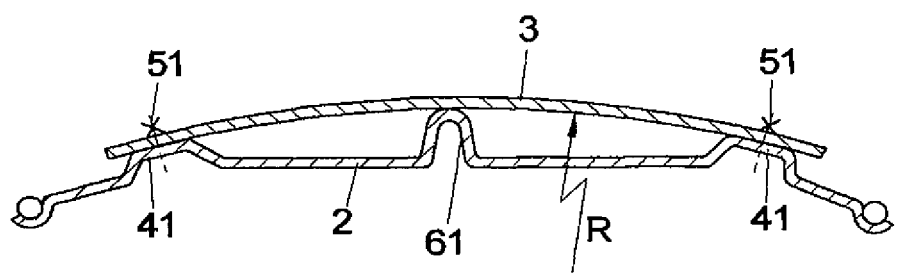
FIG. 2 shows a schematic longitudinal section through the guide rail of FIG. 1, which is braced with the carrier plate and bent to a specifiable bending radius by the supporting point.

FIG. 1 shows a schematic longitudinal section through a straight guide rail 3 preferably extruded from a plastic material or roller-burnished from a metallic material and a longitudinal section through a carrier element 2 with two fastening receptacles 41 associated to the end regions of the guide rail 3 and a supporting point 61 arranged in the center of or off-center from the fastening receptacles 41. By placing the guide rail 3 on the fastening receptacles 41 and the supporting point 61 in direction of arrow and by connecting the end regions of the guide rail 3 at the fastening points 51 of the guide rail 3 with the fastening receptacles 41 of the carrier element 2, the guide rail 3 as shown in FIG. 2 is bent with a bending radius R. What is not shown is a possible additional twisting of the guide rail 3 by an arrangement of the fastening receptacles 41 and the supporting point 61 not in alignment with each other, so that the same include an angle in longitudinal direction which determines the measure of the twisting of the guide rail 3 in longitudinal direction.

Figure 3:
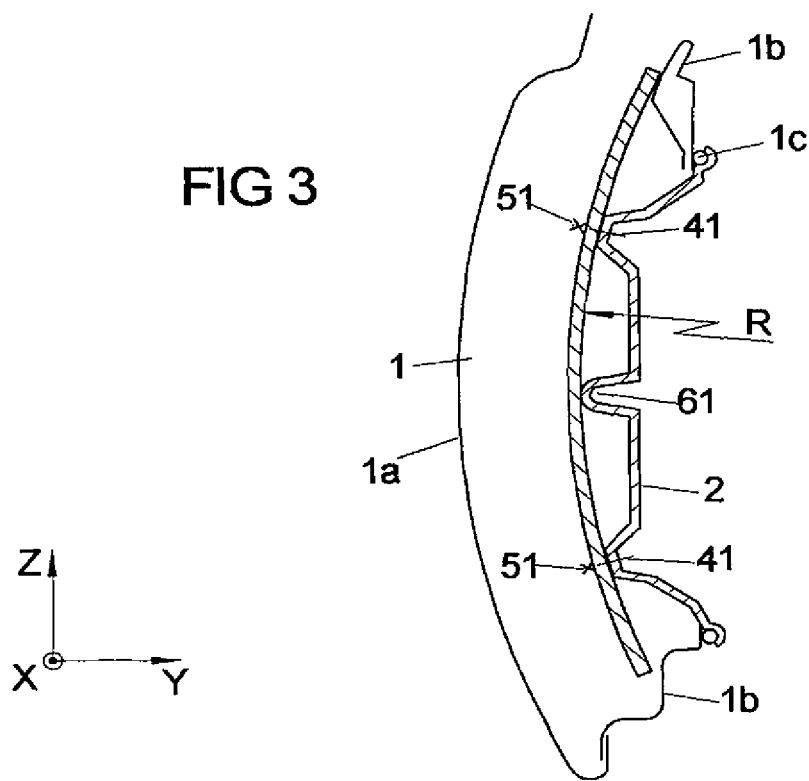
FIG. 3 shows a schematic longitudinal section through the door bodyshell of a vehicle door with carrier plate inserted therein and with a guide rail braced with the carrier plate as shown in FIG. 2.
Figure 3A:
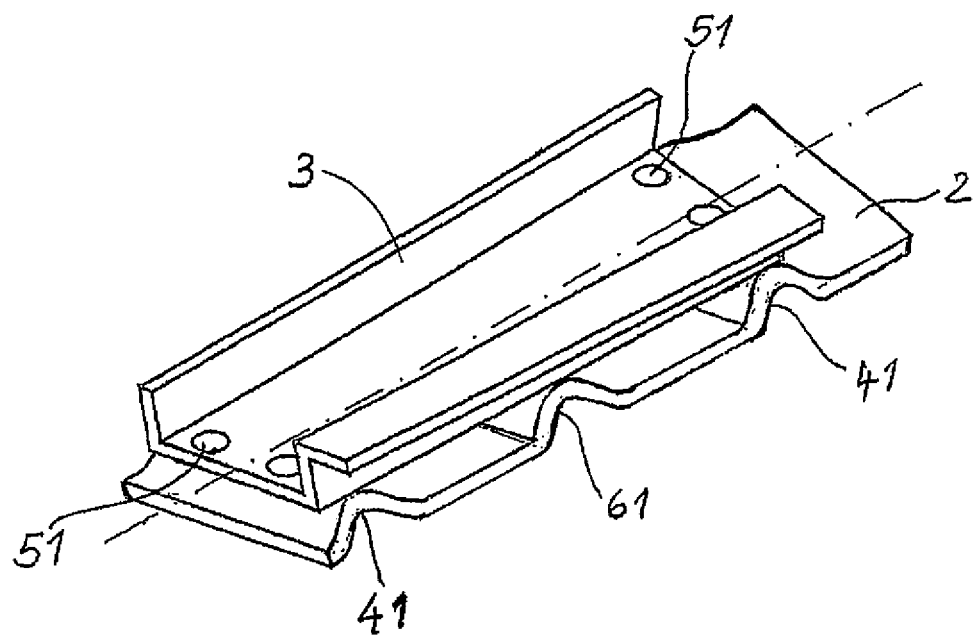
FIG. 3A shows a perspective view of a guide rail that has been twisted about its longitudinal axis.

FIG. 3 shows a schematic longitudinal section through the door bodyshell of a vehicle door 1 with a door outer panel 1a and a door inner panel 1b with carrier element 2 inserted into the vehicle door 1 and braced with the guide rail 3 in the preassembly position as shown in FIG. 2, which is connected with the door inner panel 1b of the vehicle door 1 in a manner known per se, wherein a seal 1c extending around the edge of the carrier element 2 seals an opening in the door inner panel 1b. Since only the carrier element 2 with the guide rail 3 pre-mounted thereon is attached to the door inner panel 1b of the vehicle door 1, the bending radius R of the guide rail 3, which was generated on bracing the guide rail 3 with the carrier element 2 during preassembly, is maintained.

Due to the arrangement of the supporting point 61 between the fastening receptacles 41 of the carrier element 2, not only the end regions of the guide rail 3 are used for bracing the guide rail for generating a bend and/or twist of the guide rail 3, but also the supporting point 61 is utilized, which has a shaping effect on the curvature and/or twist of the guide rail 3.

To illustrate the mounting position of the carrier element 2 with the guide rail 3 pre-mounted thereon, a system of coordinates with the longitudinal vehicle axis X, the transverse vehicle axis Y and the vertical vehicle axis Z is indicated in FIG. 3, which illustrates the orientation of the carrier element 2 and the guide rail 3 in the vehicle door 1.

The significance of the supporting point 61 is made particularly clear below with the exemplary embodiment shown in FIGS. 4 to 6, which relates to a pre-bent guide rail 3' which is connected with a carrier element 2 which includes two fastening receptacles 41 associated to the end regions of the pre-bent guide rail 3' and a fastening receptacle 42 located in between. By applying the pre-bent guide rail 3' in direction of the arrows shown in FIG. 4 to the carrier element 2 and subsequently connecting the fastening points 51, 52 of the pre-bent guide rail 3' with the fastening receptacles 41, 42 of the carrier element 2, the guide rail 3' previously pre-bent to a bending radius R1 is bent to a bending radius R2 different from the bending radius R1 and is braced with the carrier element 2 in this preassembly position.

Figure 5:
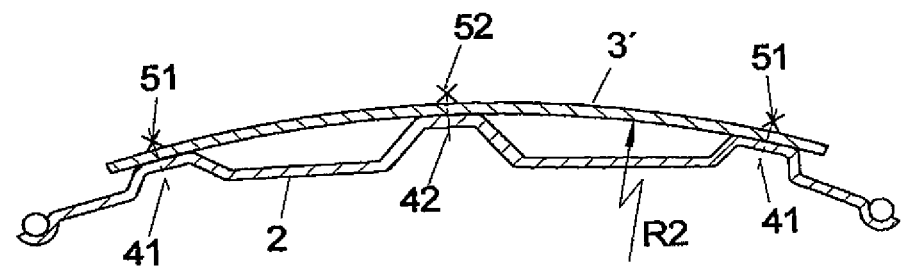
FIG. 5 shows a schematic longitudinal section through the guide rail of FIG. 4, which is braced with the carrier plate and bent to a specifiable bending radius by the supporting point.
Figure 6:
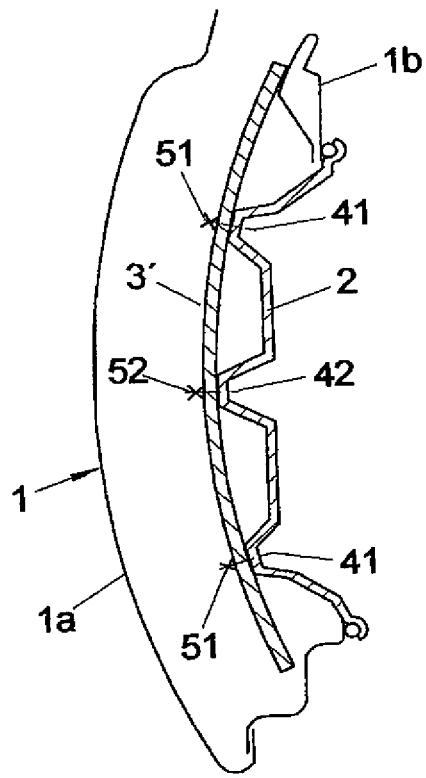
FIG. 6 shows a schematic longitudinal section through the door bodyshell of a vehicle door with carrier plate inserted therein and with a guide rail braced with the carrier plate as shown in FIG. 5.

FIG. 6 shows a schematic longitudinal section through the door bodyshell of the vehicle door 1 with the door outer panel 1a and the door inner panel 1b with the carrier element 2 inserted into the vehicle door 1 and in the preassembly position as shown in FIG. 5 braced with the guide rail 3 and connected with the door inner panel 1b of the vehicle door 1. Since only the carrier element 2 is attached to the door inner panel 1b of the vehicle door 1, the bending radius R2 of the guide rail 3', which was generated on bracing the guide rail 3' with the carrier element 2 during preassembly, is maintained.

Figure 7:
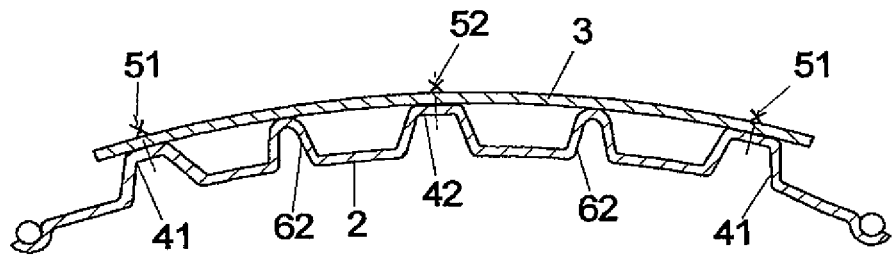
FIG. 7 shows a schematic longitudinal section through a carrier plate with three fastening receptacles and supporting points arranged in between as well as a guide rail braced with the carrier plate.
Figure 8:
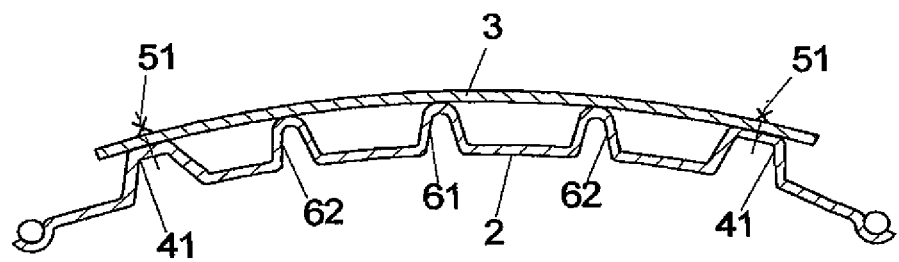
FIG. 8 shows a schematic longitudinal section through a carrier plate with three supporting points between end-side fastening receptacles and a guide rail braced with the carrier plate.
Figure 9:
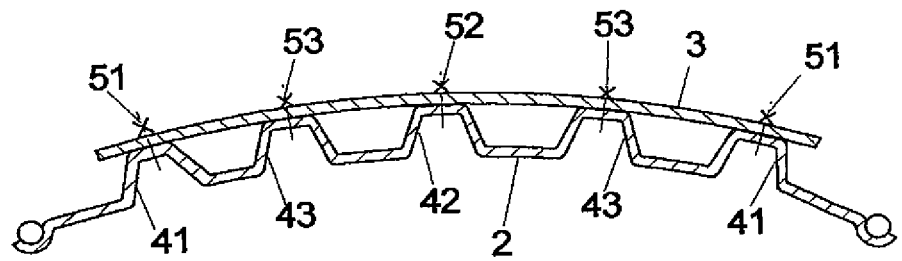
FIG. 9 shows a schematic longitudinal section through a carrier plate with five fastening points and an attached, preferably pre-bent guide rail.

In FIGS. 7 to 9 further variants of the solution according to the invention are shown in schematic longitudinal sections through a carrier element 2 with pre-mounted guide rail 3, which can be derived from the two exemplary embodiments described above.

FIG. 7 shows a variant with a carrier element 2 which includes two end-side fastening receptacles 41 associated to the end regions of the guide rail 3 and a middle fastening receptacle 42 arranged between the end-side fastening receptacles 41. Between the end-side fastening receptacle 41 and the middle fastening receptacle 42 a supporting point 62 each is provided, which in conjunction with the fastening receptacles 41, 42 has a shaping effect on the curvature and/or twist of the guide rail 3 after connecting the fastening points 51, 52 of the guide rail 3 with the fastening receptacles 41, 42 of the carrier element 2.

In FIG. 8 an embodiment is shown in a schematic longitudinal section, in which the carrier element 2 includes several, in the illustrated exemplary embodiment three supporting points 61, 62 between the fastening receptacles 41 associated to the end regions of the guide rail. When connecting the end-side fastening points 51 of the guide rail 3 with the fastening receptacles 41 of the carrier element 2, the guide rail 3 rests against the supporting points 61, 62, which thus also determine the curvature or twist of the guide rail 3 on bracing the guide rail 3 with the carrier element 2.

Figure 4:
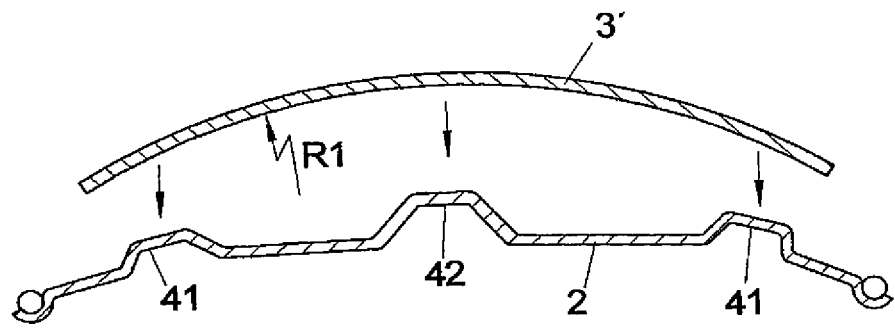
FIG. 4 shows a schematic longitudinal section through a pre-bent guide rail and a carrier plate with two fastening receptacles and a supporting point arranged in between, which is likewise formed as fastening receptacle.

FIG. 9 shows a schematic longitudinal section through an expansion of the exemplary embodiment as shown in FIGS. 4 to 6, wherein in the embodiment of FIG. 9 beside the fastening receptacles 41 associated to the end regions of the guide rail 3 and a middle fastening receptacle 42, which are connected with the fastening points 51, 52 of the guide rail 3, two further fastening receptacles 43 are arranged between the end-side fastening receptacles 41 and the middle fastening receptacle 42, which are connected with fastening points 53 of the guide rail 3. In this embodiment, the fastening receptacles 42 and 43 form supporting points which at the same time serve the fixation of the guide rail 3, in particular a pre-bent guide rail 3.

Figure 10:
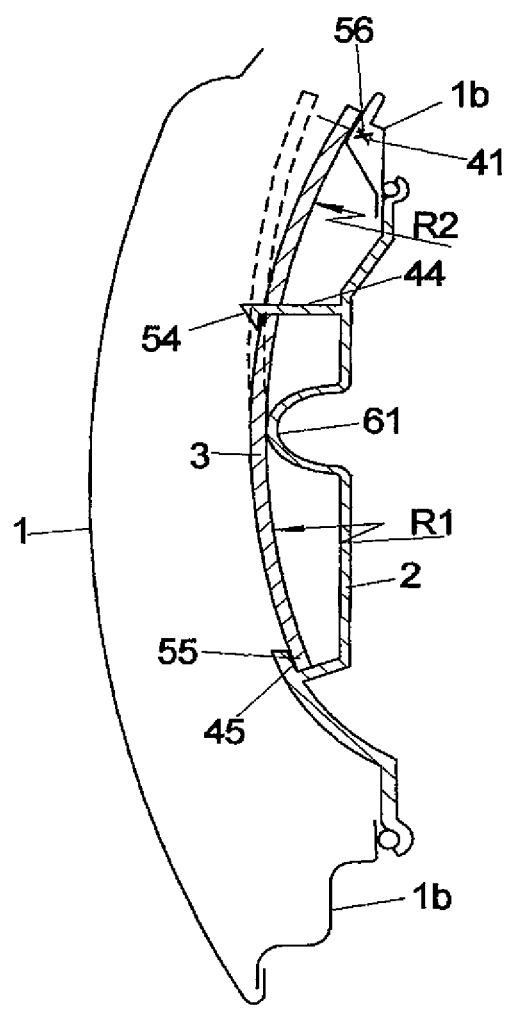
FIGS. 10 and 11 show a schematic longitudinal section through an assembly inserted into a vehicle door, comprising a guide rail pre-bent with a first bending radius and pre-mounted on a carrier plate in the pre-bent condition, which by connecting with the vehicle door is bent with a second bending radius.
Figure 11:
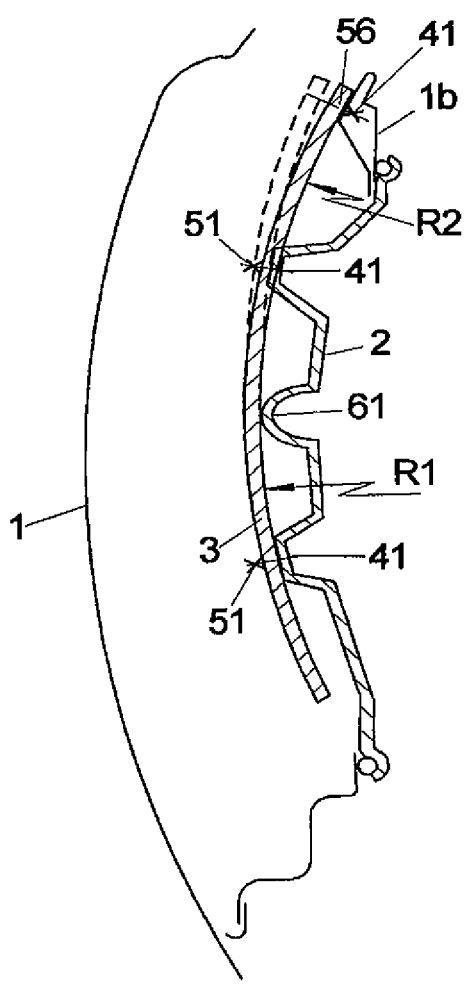

In FIGS. 10 and 11 two exemplary embodiments are shown in a schematic longitudinal section, in which the guide rail 3 pre-mounted on a carrier plate, a function carrier or assembly carrier 2 and pre-bent with a first bending radius R1 is connected with the vehicle door 1 as second carrier element after inserting the carrier plate, the function or assembly carrier 2 into a vehicle door 1 at an upper fastening point 56, in order to generate a second bending radius R2 or an additional twist.

In a schematic longitudinal section through a vehicle door 1, FIG. 10 shows a preassembly group consisting of a carrier plate or a function or assembly carrier 2 as first carrier element with an extruded guide rail 3 pre-mounted on the carrier plate 2, wherein the preassembly position of the guide rail 3 is shown in broken lines. In this preassembly position, the guide rail 3 is connected with the carrier plate 2 via two fastening points 54, 55, which carrier plate 2 includes a first receptacle 44 which consists of a clip protruding vertically from the surface of the carrier plate 2, which is put through a first fastening point 54 of the guide rail 3 formed as opening, in order to fix the guide rail 3 in the preassembly position.

A second fastening receptacle 45 of the carrier plate 2 is formed as hook or pocket, into which the lower end of the guide rail 3, which forms a lower fastening point 55, is put in the preassembly position. The fastening receptacle 45 formed as hook or pocket determines the positioning of the guide rail 3 in Y- and Z-direction of the motor vehicle.

Through a supporting point 61 arranged between the fastening receptacles 44, 45 on the carrier plate 2 a contact point for the guide rail 3 is specified, by which in conjunction with the arrangement and design of the fastening receptacles 44, 45 a first bending radius R1 of the guide rail 3 is determined in the preassembly position.

After attaching or inserting the preassembly group into an opening of the door bodyshell of the vehicle door 1 provided in the door inner panel 1b of the vehicle door 1, the upper end of the guide rail 3 with the fastening point 56 is connected with the sill region of the door inner panel 1b as fastening receptacle 41 for example by means of a screw connection, whereby the guide rail 3 obtains a second bending radius R2 which can correspond with the first bending radius R1 or differ from the same. The guide rail 3 thereby obtains a specified pull-off line when lifting and lowering the driver longitudinally movable along the guide rail 3, which accommodates a window pane for opening and closing a door opening along the guide rail 3.

While the arrangement of the clip 44 on the carrier plate 2 determines the orientation of the guide rail 3 in X-direction, the length of the clip 44 or the height of the supporting point 61 determines the bending radius R1 of the guide rail 3 in the preassembly position. When arranging a clip 44 offset in X-direction of the motor vehicle with respect to the hook or the pocket 45, the guide rail 3 thus is inclined in the one or other direction in X-direction.

In a longitudinal section, FIG. 11 shows a preassembly group consisting of a carrier plate 2, in particular a function or assembly carrier, which is inserted into a vehicle door 1, comprising a guide rail 3 braced with the carrier plate 2 corresponding to the embodiment as shown in FIGS. 1 to 3. In the preassembly position, the guide rail 3 is bent to a bending radius R1 by connecting the fastening points 51 to the fastening receptacles 41 of the carrier plate 2 and by supporting on the supporting point 61 arranged between the fastening receptacles 41 at the carrier plate 2. After inserting the preassembly group into the opening of the vehicle door 1, the upper end of the extruded guide rail 3 is connected with the door sill 1b as fastening receptacle 41 at the fastening point 56 for example by screwing to the door inner panel 1b, wherein in the upper region of the guide rail 3 between the upper fastening point 51 and the fastening point 56 a second bending radius R2 of the guide rail 3 is formed.

Figure 12:
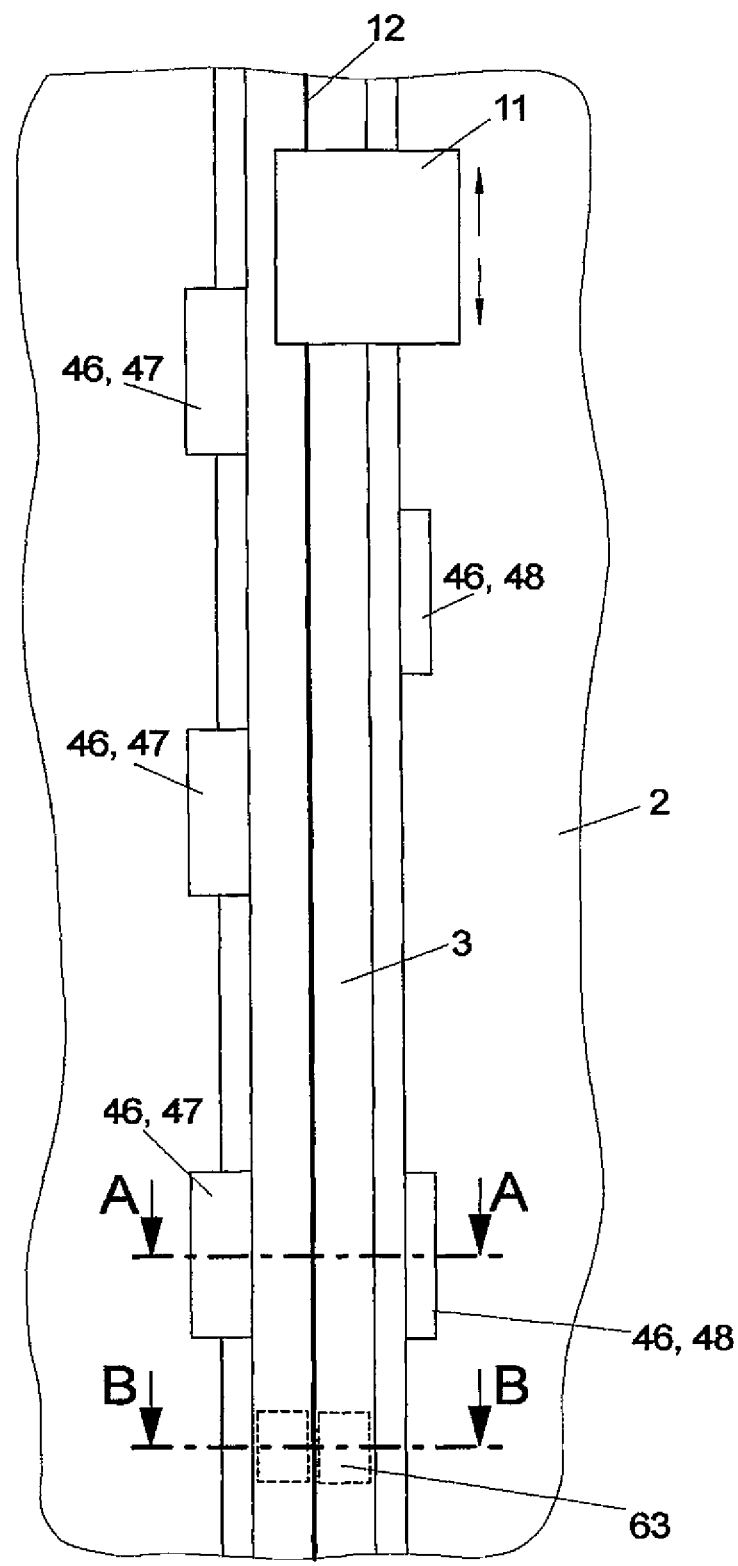
FIG. 12 shows a schematic top view of a carrier element and a guide rail with a longitudinally adjustable driver, which is braced with the carrier element via several fastening and supporting points.

FIG. 12 shows a top view of a carrier element 2 formed for example as function carrier of a plastic material and an extruded plastic guide rail 3 braced with the carrier element 2, which is braced with the carrier element 2 via fastening receptacles 46, wherein at least one supporting point 63 additionally has a shaping effect on the curvature and/or twist of the guide rail 3. A driver or rail slider 11 is adjustable along the guide rail 3 in direction of the double arrow 2 shown at the driver 11, so that a window pane connected with the driver 11 is moved up and down. For this purpose, the driver 11 is connected with a window lifter drive via a cable 12.

The connection of the guide rail 3 with the carrier element 2 at the fastening receptacles 46 will be explained with reference to a cross-section along line A-A of FIG. 12 for various exemplary embodiments shown in FIGS. 13 and 15 to 18, and the shaping support of the guide rail 3 on the carrier element 2 via the supporting point 63 will be explained in an exemplary embodiment shown in FIG. 14 with reference to a section along line B-B of FIG. 12.

Figure 13:
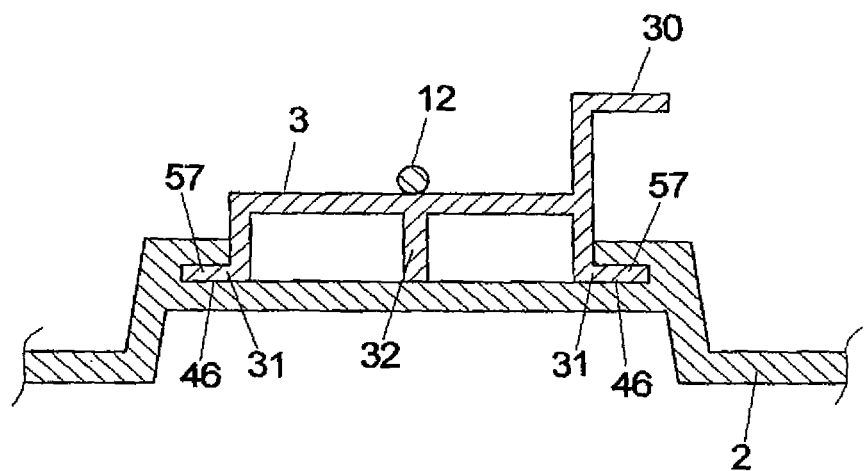
FIG. 13 shows a section through a fastening point in a first variant of the connection of the guide rail with the carrier plate along the sectional line A-A as shown in FIG. 12.

In the exemplary embodiment as shown in FIG. 13, the connection of the guide rail 3 with the carrier element 2 and hence the bend or twist of the guide rail 3 is accomplished by a fastening receptacle 46 formed as slotted box section and by fastening points 57 at the angled side legs 31 of the guide rail 3, which engage into the slotted box section of the fastening receptacles 46. The connection between the guide rail 3 and the carrier element 2 is accomplished by putting the guide rail 3 with the angled side legs 31 into the fastening receptacles 46 of the carrier element 2.

A middle web 32 of the guide rail 3, which supports on the surface of the carrier element 2, serves the stabilization of the extruded plastic guide rail 3 along which the cable 12 shown in section is guided and which includes an angled rail portion 30 on which the driver 11 as shown in FIG. 12 is guided.

Figure 14:
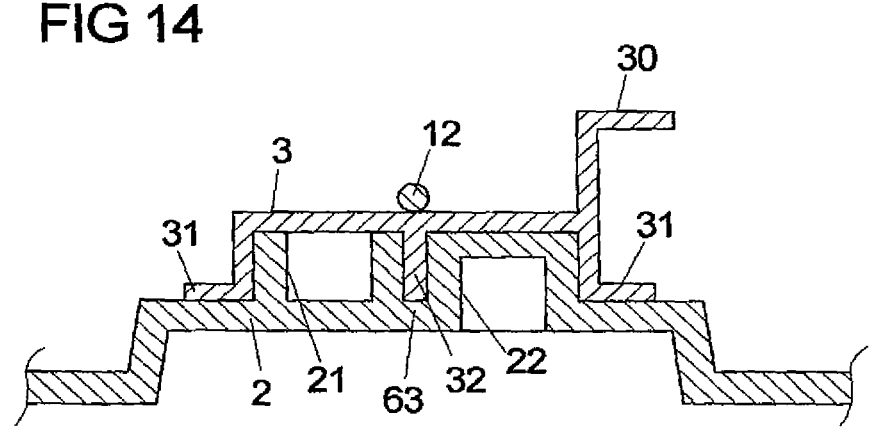
FIG. 14 shows a section through a supporting point of the first variant of the connection of the guide rail with the carrier plate along the sectional line B-B as shown in FIG. 12.

The supporting point 63 shown in FIG. 14 along the section B-B of FIG. 12 is formed as supporting region, which is formed by legs 21 or box-shaped formations 22 vertically protruding from the surface of the carrier element 2, wherein the web 32 of the guide rail 3 engages into a slot formed between the one leg 21 and the box-shaped formation 22.

By the legs 21 and the box-shaped formation 22 supporting regions are created on the carrier element 2, which increase the stability of the guide rail 3.

In a second embodiment shown in FIGS. 15 to 18, the guide rail 3 is inserted into the one fastening receptacle 48 of the carrier element 2 formed as undercut and is clipped into a second fastening receptacle 47 formed as clip vertically protruding from the surface of the carrier element 2. FIGS. 15 to 18 show the guide rail 3 each before and after clipping into the fastening receptacles of the carrier element 2, likewise in a section along line A-A of FIG. 12.

Figure 15:
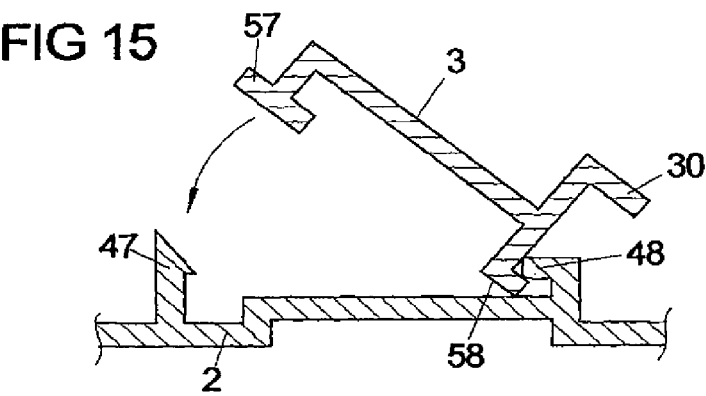
FIG. 15 shows a section through a fastening point of a second variant of the connection of the guide rail with the carrier plate during assembly of the guide rail to the carrier plate.
Figure 16:
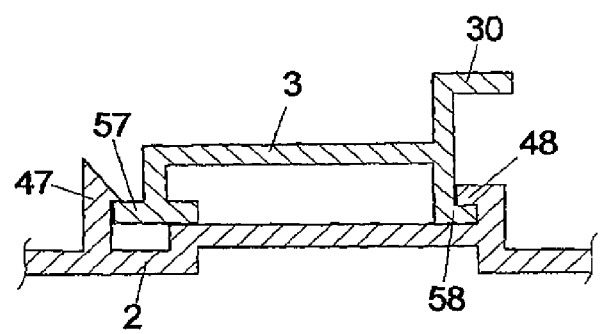
FIG. 16 shows a section through the fastening point of the second variant as shown in FIG. 15 after connecting the guide rail with the carrier plate along the sectional line A-A as shown in FIG. 12.

The fastening points 57 and 58 of the guide rail 3, which cooperate with the fastening receptacles 47 and 48 of the carrier element 2, are formed as angled legs of which the fastening point 58 of the guide rail 3 cooperating with the undercut 48 is put into the hook-shaped opening of the undercut 48, and the guide rail 3 is pivoted about this positive connection corresponding to the arrow shown in FIG. 15, until the other fastening point 57 of the guide rail 3 is clipped into the fastening receptacle 47 of the carrier element 2 formed as clip, as shown in FIG. 16.

Figure 17:
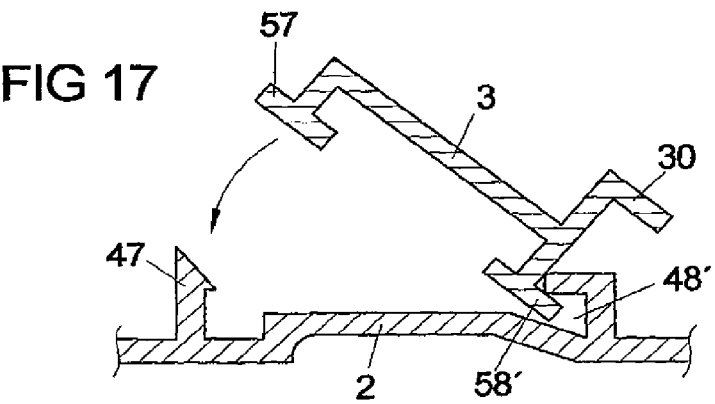
FIG. 17 shows a section through a fastening point of a modification of the second variant of the connection of the guide rail with the carrier plate during assembly of the guide rail to the carrier plate.
Figure 18:
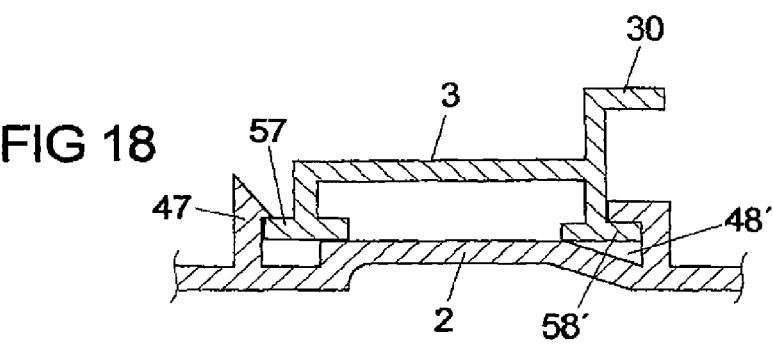
FIG. 18 shows a section through the fastening point of the modification of the second variant as shown in FIG. 17 after connecting the guide rail with the carrier plate along the sectional line A-A as shown in FIG. 12.

The embodiment shown in FIGS. 17 and 18 differs from the embodiment shown in FIGS. 15 and 16 to the effect that the undercut 48' forming a fastening receptacle includes an additional cutout which provides for an elongation of the angled web 58' of the guide rail 3 and hence a higher stability of the connection of the guide rail 3 with the carrier element 2.

Figure 19:
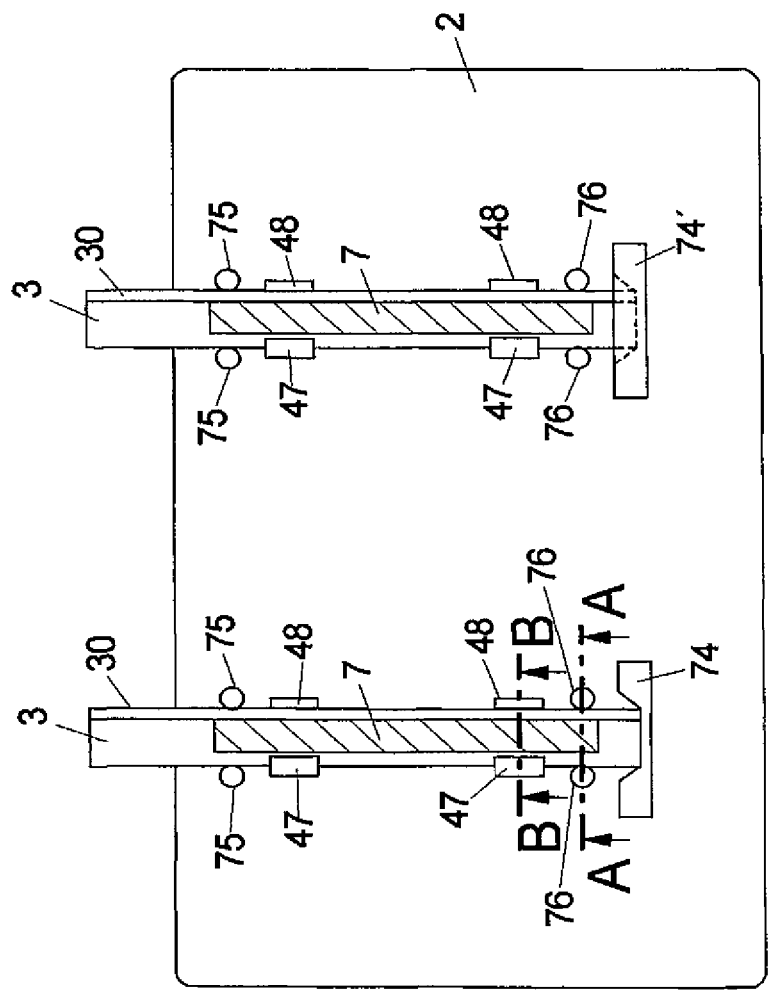
FIGS. 19-23 show a top view and cross-sections through the connection of a guide rail with a carrier element via adhesive connections with adjustment aids and clips for fixing the guide rail on the carrier element until curing of the adhesive in different variants.

FIG. 19 shows a top view of a carrier element 2 which for example is formed as function carrier and when mounted in a vehicle door covers a door opening. On the carrier element 2, two guide rails 3 with sliding and guide legs 30 molded to the guide rails 3 are mounted for guiding a driver adjustable along the guide rail 3, which in the manner described above are braced with the carrier element 2 for bending and/or twisting the guide rails 3. The guide rails 3 for example consist of an extruded plastic rail or a roller-burnished steel or aluminum rail. Lower stops 74, 74' formed on the carrier element, of which the one stop is formed as plug-in pocket 74', serve for mounting and fixing the guide rails 3. As mounting aid and for aligning the guide rails 3 on the carrier element 2 upper and lower side stops 75, 76 are used, of which the lower side stops 76 are shown in cross-section in FIG. 20 in a section along line A-A.

In this exemplary embodiment of the solution according to the invention, the connection between the guide rail 3 and the carrier element 2 is made by an adhesive 7, which is applied onto the guide rails 3 and/or the carrier element 2 over a large area. To fix the guide rails 3 until curing of the adhesive 7 in a position correspondingly pressed against the carrier element 2, a plurality of clips 47, 48 arranged along the guide rail 3 on the carrier element 2 are used, which are shown in cross-section in a section along line B-B of FIG. 21.

Figure 20:
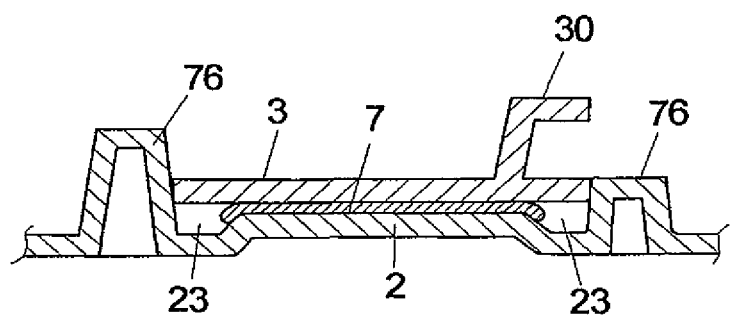

In the section along line A-A of FIG. 19, FIG. 20 shows the lower mounting aid for aligning the guide rail 3 on the carrier element 2, which consists of box-shaped elevations or domes 76 of the carrier element 2, which are spaced from each other by the width of the guide rail 3, so that the lateral edges of the guide rail 3 rest against the box-shaped elevations 76. The connection of the guide rail 3 with the carrier element 2 is made by an adhesive 7, which is applied over a large area on the surface of the carrier element 2 facing the bottom surface of the guide rail 3 between the box-shaped elevations or domes 76. Excess adhesive 7 can flow off in chambers 23 formed between the surface of the carrier element 2 and the box-shaped elevations 76.

Figure 21:
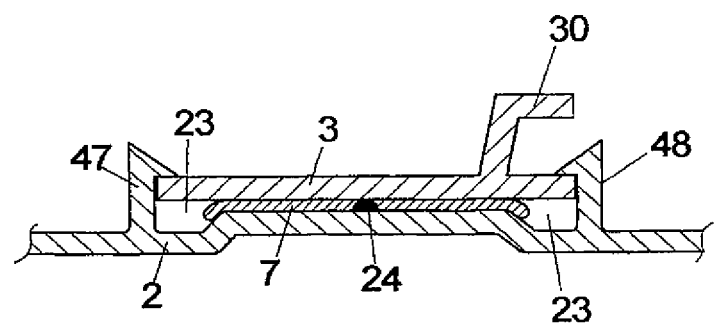

In a section along line B-B of FIG. 19, FIG. 21 shows the fixation of the guide rail 3 on the carrier element 2 by means of clips 47, 48 arranged laterally of the lateral edges of the guide rail 3, which in the condition of the guide rail 3 clipped in embrace the lateral edges of the guide rail 3 and fix the guide rail 3 until curing of the adhesive 7. To ensure a defined layer thickness of the adhesive 7, the surface of the carrier element 2 facing the bottom surface of the guide rail 3 includes a spacer 24 which when clipping the guide rail 3 onto the carrier element 2 ensures a sufficient distance between the bottom surface of the guide rail 3 and the upper surface of the carrier element 2, in which the adhesive 7 is effective. In the region of the clips 47, 48 there are also provided lateral chambers 23, into which excess adhesive 7 can flow off.

Figure 22:
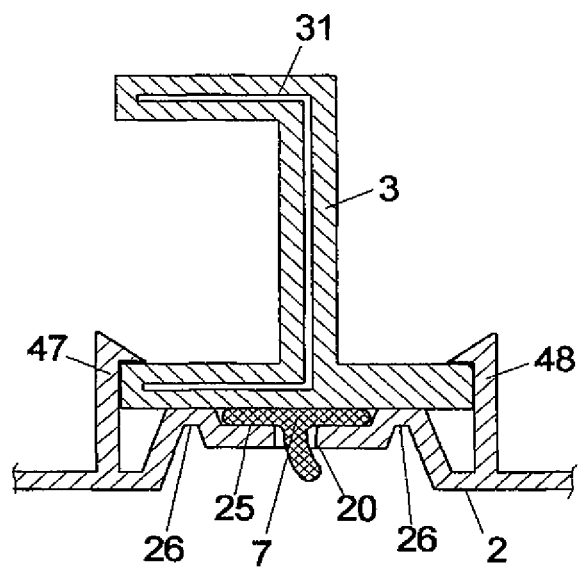

FIG. 22 shows a modification of the embodiment of FIG. 21, in which into the extruded plastic guide rail 3 an extruded fleece, fabric, paper or a film 31 for rigidity improvement of the guide rail 3 is inserted into the guide rail 3 in sandwich construction and preferably is extruded together with the guide rail 3. An adhesive 7 serves as fastening point for connecting the guide rail 3 with the carrier element 2, wherein for fixing the guide rail 3 on the carrier element 2 until curing of the adhesive 7 clips 47, 48 are arranged, which embrace the lateral edges of the guide rail 3, when the same is clipped into the carrier element 2.

For taking up the adhesive 7, the carrier element 2 includes a cup-like depression 25 between the clips 47, 48, which is defined by lateral domes or elevations 26 which serve as spacers for ensuring a specified layer thickness of the adhesive 7. In this embodiment, excess adhesive 7 can flow off via an opening 20 of the cup-like depression 25.

Figure 23:
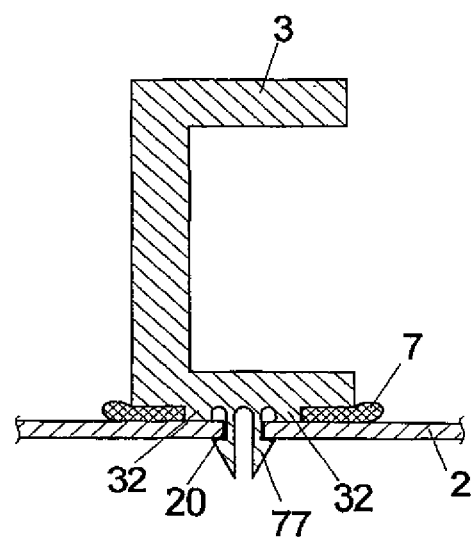

FIG. 23 shows a variant in which the connection of the guide rail 3 with the carrier element 2 likewise is effected via an adhesive 7, wherein in this embodiment a clip 77 protruding from the bottom surface of the guide rail 3 to be connected with the carrier element 2 is provided for attaching the guide rail to the carrier element until curing of the adhesive 7, which is put through an opening 20 of the carrier element 2 and fixes the guide rail 3 at a defined distance to the surface of the carrier element 2, wherein two webs 32 arranged laterally of the clip 77 on the bottom surface of the guide rail 3 and supporting on the surface of the carrier element 2 are provided as spacers for a defined layer thickness of the adhesive 7, which in this embodiment also serves for sealing the connection of the guide rail 3 with the carrier element 2.

Figure 24:
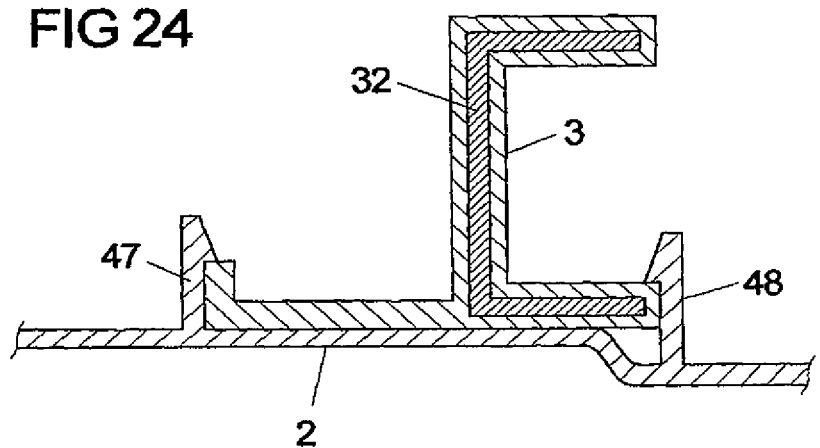
FIG. 24 shows a cross-section through the connection of a carrier element and a guide rail with an insert for increasing the rigidity of the extruded guide rail.

In a cross-section through the connection of a guide rail 3 with a carrier element 2, FIG. 24 shows a modification of the embodiment of FIG. 22, in which an insert 32 is inserted into the extruded guide rail 3 for an increase in rigidity or strength by multi-component construction. The insert 32 can consist of an aluminum or plastic section, wherein the 2-component technique preferably is employed when using a plastic insert. In this embodiment, the connection of the guide rail 3 with the carrier element 2 is limited to clipping the guide rail 3 into clips 47, 48 protruding from the surface of the carrier element 2 without using an adhesive.

Figure 25:
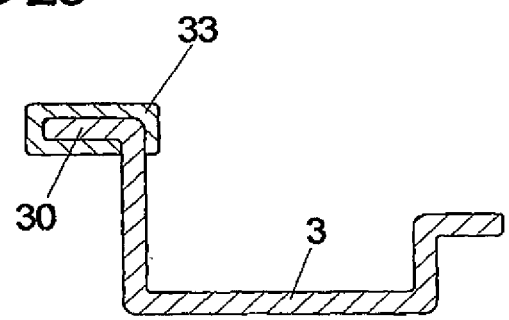
FIG. 25 shows a cross-section through a coextrusion of a guide rail and a guide leg with optimized sliding properties.

FIG. 25 shows a cross-section through an extruded guide rail 3, which has been manufactured in multi-component technique by coextrusion, wherein a first plastic material determines the rigidity of the extruded guide rail 3, while a second plastic material 33 extruded around the guide leg 30 for guiding a driver optimizes the sliding properties.

Figure 26:
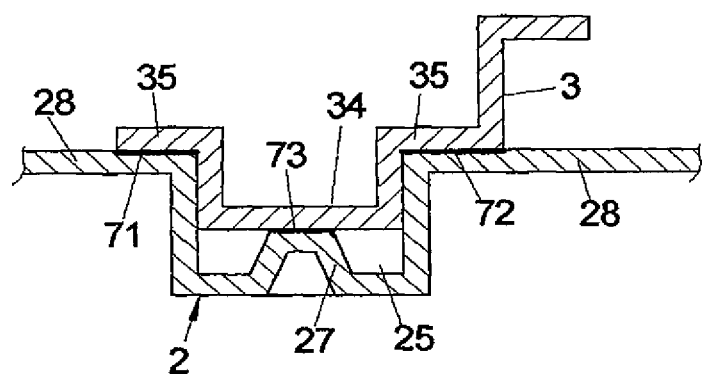
FIG. 26 shows a cross-section through the connection of a carrier element and a guide rail with cavities and closed sections for a high moment of resistance and high mechanical stability.

The embodiment represented in FIG. 26 shows a section through a carrier element 2 with a cup-like depression 25 with a central trapezoidal dome 27 extending in longitudinal direction of the carrier element and a guide rail 3 with a cup-shaped depression 34 from which side legs 35 protrude, which rest flush on legs 28 of the carrier element 2 protruding laterally of the cup-like depression 25 of the carrier element 2, whereas the cup-shaped depression 34 of the guide rail 3 rests on the trapezoidal dome 27 of the carrier element 2. On the contact surfaces of the side legs 35 of the guide rail 3 with the legs 28 of the carrier element 2 adhesive layers 71, 72 are applied, and on the contact surface of the bottom surface of the cup-shaped depression 34 of the guide rail 3 with the trapezoidal dome 27 protruding from the cup-like depression 25 of the carrier element 2 an adhesive layer 73 is applied, which effect a compact, firm connection between the carrier element 2 and the guide rail 3, wherein analogous to the embodiment of FIGS. 13 and 14 a high moment of resistance of the combination of guide rail 3 and carrier element 2 is generated with a high mechanical stability by creating cavities of the closed sections.

Figure 27:
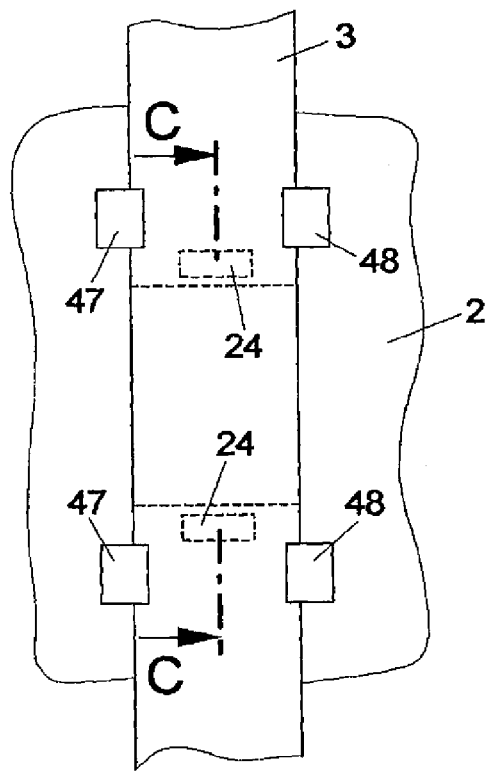
FIGS. 27-29 show top views and a longitudinal section through the connection of a carrier element and a guide rail by means of an adhesive surface, clips for fixing the connection until curing of the adhesive, and a structured surface of the carrier element for taking up the adhesive.

FIG. 27 shows a top view of a guide rail 3 connected with a carrier element 2, which above and below and on both sides of an adhesive surface 70 is fixed on the carrier element 2 with a plurality of clips 47, 48 arranged on the carrier element 2 along the guide rail 3 until curing of the adhesive, analogous to the embodiment as shown in FIGS. 19 to 24. Above and below the adhesive surface 70 spacers 24 are arranged, which when clipping the guide rail 3 onto the carrier element 2 ensure a sufficient distance between the bottom surface of the guide rail 3 and the upper surface of the carrier element 2, in which the adhesive is effective. To increase the stability of the carrier element 2 and for an optimum absorption of adhesive, the carrier element 2 has a structured surface 29 between the spacers 24, at whose ends chambers 23 are provided, into which excess adhesive can flow off.

Figure 28:
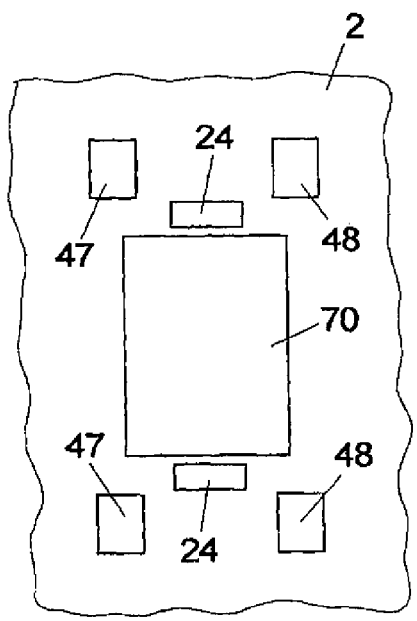

In a top view of the carrier element 2 with the guide rail 3 omitted, FIG. 28 shows the adhesive surface 70 with spacers 24 arranged above and below the adhesive surface 70 as well as clips 47, 48 arranged above and below as well as laterally of the adhesive surface 70 for fixing the guide rail 3 until curing of the adhesive.

Figure 29:
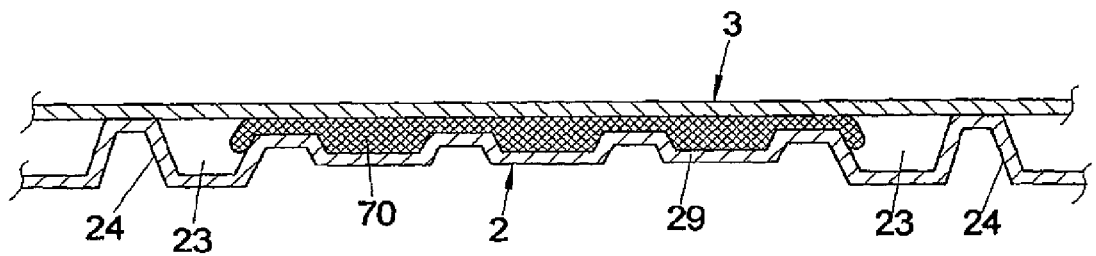

In a section along line C-C of FIG. 27, FIG. 29 shows a longitudinal section through the connecting region of the guide rail 3 with the carrier element 2. The structured surface 29 consists of alternating depressions and elevations and in longitudinal extension of the guide rail 3 on both sides is delimited by the spacers 24, which ensure a defined thickness of the adhesive. After application of the adhesive 7, the straight, preferably extruded guide rail 3 of this embodiment is placed on the spacers 24 and fixed with the clips 47, 48, until the adhesive applied onto the adhesive surface 70 is cured.

Figure 30:
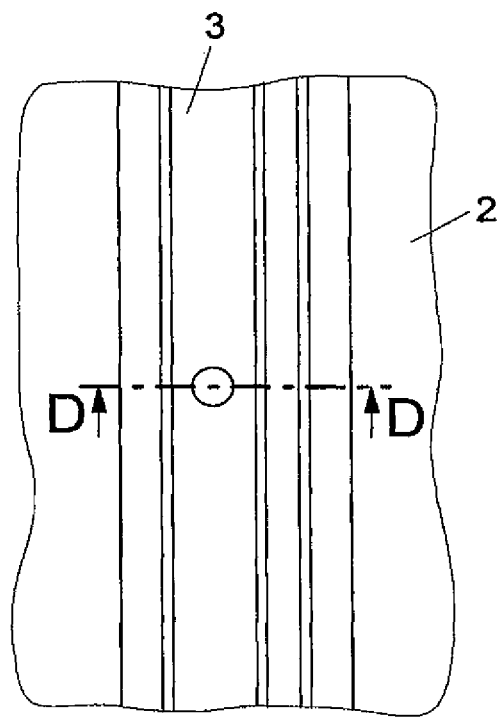
FIGS. 30-32 show a top view and cross-sections through the connection of a carrier element with a guide rail in sandwich construction with a rivet or a screw for securing the connection.
Figure 31:
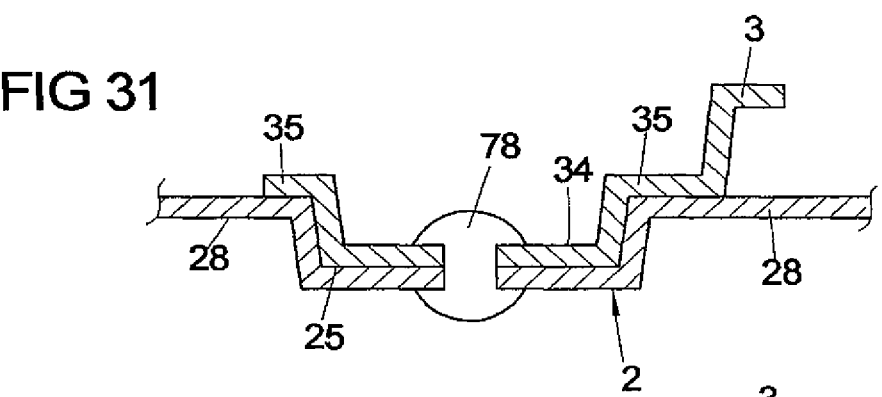
Figure 32:
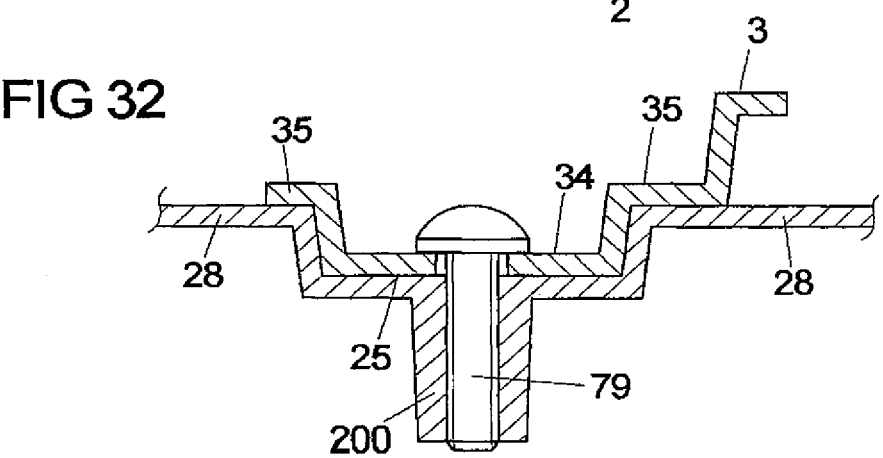

FIG. 30 shows a top view of the connection of a guide rail 3 with a carrier element 2, which in FIGS. 31 and 32 is shown in two different embodiments in a section along line D-D of FIG. 30.

In the two embodiments shown in FIGS. 31 and 32, analogous to the embodiment of FIG. 26, the carrier element 2 includes a rectangular or trapezoidal depression 25 with legs 28 horizontally angled from the edge of the depression, to which a rectangular or trapezoidal depression 34 of the guide rail 3 is adapted, which with its side legs 35 horizontally angled from the edge of the depression rests on the legs 28 of the carrier element 2 angled from the rectangular or trapezoidal depression 25. In the embodiment of FIG. 31, the connection between the guide rail 3 and the carrier element 2 is made by a rivet 78 and in the embodiment of FIG. 32 by a screw 79 at the bottom of the rectangular or trapezoidal depressions 25, 34 of the carrier element 2 and the guide rail 3. In the screw connection, a dome-like protuberance 200 protrudes from the bottom of the rectangular or trapezoidal depression 25 of the carrier element 2 for providing a sufficient length for the thread of the screw 79.

Since the beveled edges of the carrier element 2 and of the guide rail 3 engage in each other, a closed section with a high moment of resistance and hence a high mechanical stability also is created in these embodiments to improve the rigidity of the guide rail 3. The carrier element 2 for example is a steel or aluminum function carrier, while the guide rail 3 is formed as extruded plastic rail or roller-burnished steel or aluminum rail.

Figure 33:
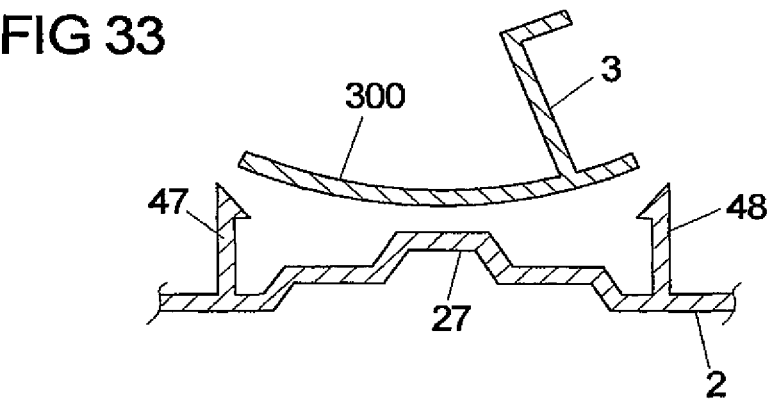
FIGS. 33-35 show cross-sections through the connection of a carrier element with a guide rail with pre-bent base surface, securing of the connection by means of clips and establishing a durable connection by laser welding.
Figure 34:
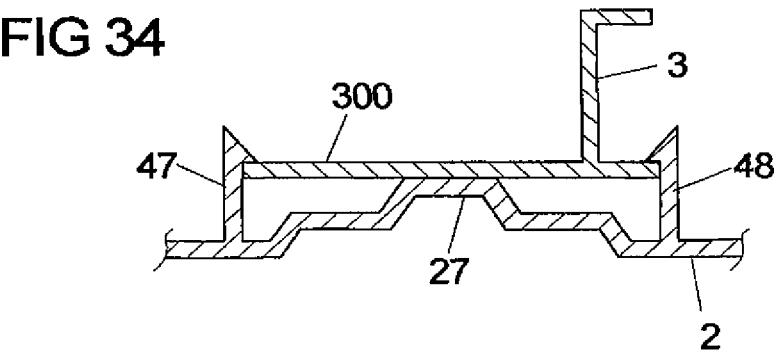
Figure 35:
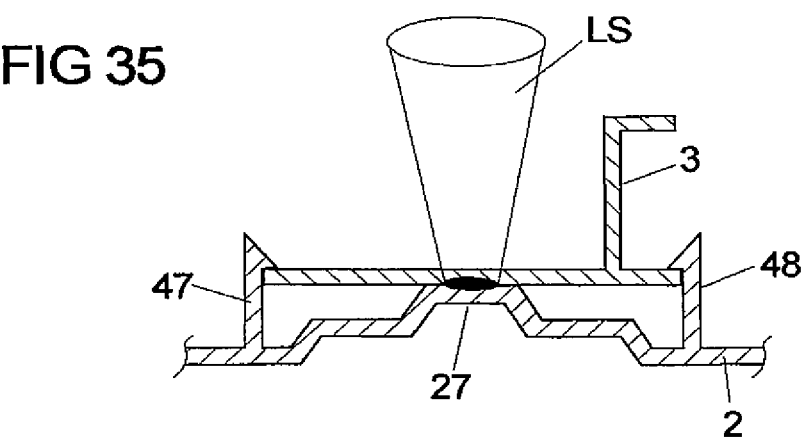

The embodiment shown in FIGS. 33 to 35 links with the embodiment of FIGS. 20 to 22 and 26 as well as FIGS. 31 and 32. The carrier element 2 includes a stepped, dome-shaped elevation 27 with a central contact region and two lateral clips 47, 48, whereas the guide rail 3 contains a pre-bent base surface 300, from which the guide region of the guide rail 3 is angled. By clipping the bent base surface 300 of the guide rail 3 into the receiving region of the carrier element 2, the bent base surface 300 of the guide rail 3 as shown in FIG. 34 is straightened, but fixed by the clips 47, 48 such that the previously bent base surface 300 of the guide rail 3 in the region of the bearing surface rests on the stepped, dome-shaped elevation 27 of the carrier element 2 under pretension. By laser welding by means of a laser beam LS, as shown in FIG. 35, the guide rail 3 is attached to the carrier element 2 between the base surface 300 of the guide rail 3 and the stepped, dome-shaped elevation 27 of the carrier element 2.

In this embodiment, the guide rail 3 is formed as extruded plastic rail with a material permeable or transmissive for laser radiation. The carrier element 2 preferably also is made of plastic material with a material absorbing the laser radiation.

The inventive solution of twisting or bending a guide rail for increasing the stability and creating a specifiable pull-off of a window pane can also be realized by including further elements of a window lifter, wherein these elements only can serve for twisting or bending the guide rail, only for increasing the stability and rigidity of the guide rail and/or of the carrier element or both for twisting or bending the guide rail and for increasing the stability and rigidity.

In FIGS. 36 to 38 three exemplary embodiments are shown, in which a cable pulley holder or a cassette 15 of a cable window lifter accommodating a cable pulley 14 deflecting a window lifter cable is integrated into the connection of a guide rail 3 with a carrier element 2, for example a door inner panel or a carrier plate or a function carrier.

In the exemplary embodiments shown in FIGS. 36 and 37 the support of the guide rail 3 is effected via the cassette 15 accommodating the cable pulley 14. The cassette 15 includes two bearing surfaces 151, 152 which form a rear grip of the cassette 15 of the guide rail 3 and on the one hand engage around the upper edge of the guide rail 3 and on the other hand are put through an opening 37 of the guide rail and with which the cassette 15 is put onto the guide rail 3. Through a cutout 36 in the guide rail 3 the cassette 15 with the cable pulley 14 and a stepped pin with internal thread 16, 17, on which the cable pulley 14 is mounted, is connected with the cassette 15. The cassette 15 supports on the carrier element 2 via the two bearing surfaces 151, 152 and is connected with the carrier element 2 by means of a screw 19 put through an opening 20 of the carrier element 2, which is screwed to the internal thread of the stepped pin 16, 17.

In the embodiment of FIG. 36 the bottom 160 of the stepped pin with internal thread 16 is spaced from the carrier element 2, whereas the exemplary embodiments represented in FIGS. 37 and 38 show screw-through solutions for an increase in stability, wherein in the embodiment of FIG. 37 the bottom 170 of the stepped pin with internal thread 17 and the cassette 15 support on the carrier element 2 via the two bearing surfaces 151, 152, so that the cassette 15 is loaded, whereas in the exemplary embodiment shown in FIG. 38 a relief of the cassette 15 is effected in that the same is merely put onto the guide rail 3, but does not support on the carrier element 2 itself via the bearing surfaces 151, 152.

In the embodiment as shown in FIG. 38 the connection of the cable pulley 14, the cassette 15 and the guide rail 3 with the carrier element 2 is effected via a stepped pin 18 whose bottom 180 rests against the carrier element 2 and is attached to the carrier element 2 with a screw 19 put through an opening 20 of the carrier element 2, which is screwed to the internal thread of the stepped pin 18.

The above-described mounting of guide rails of a window lifter into the door bodyshell of a vehicle door for manufacturing a bent and/or twisted guide rail during the connection of fastening points of the guide rail with fastening receptacles on a carrier element, for example the door bodyshell of a vehicle door, an assembly carrier or a window lifter base plate, and supporting points for manufacturing a desired pull-off kinematics, also is applicable to assembly carriers or base plates with integrated guide rails. The various applications and possibilities of use will be explained below with reference to FIGS. 39 to 70.

Figure 39:
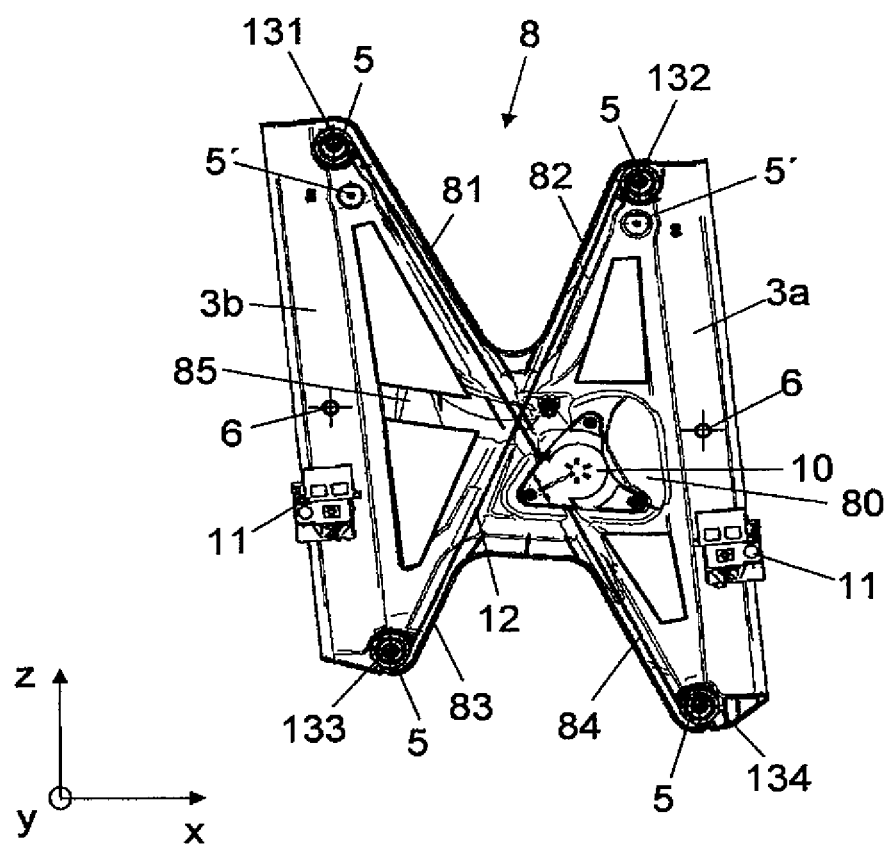
FIG. 39 shows a schematic view of a base plate with two guide rails for a window lifter integrated into the base plate.

In relation to a coordinate system with the longitudinal vehicle axis or x-axis, the transverse vehicle axis or y-axis extending vertically to the drawing plane and the vertical vehicle axis or z-axis, FIG. 39 shows a base plate 8 for a window lifter with the components of a double-stranded window lifter arranged thereon, namely a drive unit 10 with a cable drum for driving a window lifter cable 12, which is guided via cable or deflection pulleys 131, 132, 133, 134 and is connected with two drivers 11 arranged and guided on guide rails 3a, 3b. The drivers 11 coupled with a window pane are lifted or lowered on the guide rails 3a, 3b depending on the driving direction of the drive unit 10, whereby the window pane opens or closes a window opening of a door frame.

The flexible guide rails 3a, 3b are formed in particular bendable about the longitudinal vehicle axis or x-axis and twistable about the vertical vehicle axis or z-axis and integrated into the base plate 8. For this purpose, the base plate 8 has a middle region 80 connected to the center of the one guide rail 3a, which is made of a rigid material and/or has a cross-section or a cross-sectional shape with a high moment of resistance. From the rigid region 80 connecting portions 81, 82, 83, 84 formed as diagonal struts lead to the upper and lower ends of the guide rails 3a, 3b and a transverse strut 85 leads to the center of the other guide rail 3b. At the upper and lower ends of the guide rails 3a, 3b deflection pulleys 131, 132, 133, 134 for deflecting the window lifter cable 12 are arranged, whose axles also can serve as fastening points 5 for connecting the base plate 8 with the door bodyshell, in that fastening bolts are put through the axles of the cable or deflection pulleys 131, 132, 133, 134 and are connected with the door bodyshell of a vehicle door.

Alternatively, separate fastening points 5' can be provided in the connection for example between the upper ends of the flexible guide rails 3a, 3b to the diagonal struts 81, 82 like in FIG. 39, through which fastening bolts are put and connected with the door bodyshell.

On both sides of the rigid region 80 of the base plate 8, two supporting points 6 are provided on the flexible guide rails 3a, 3b, which alternatively can also be utilized as fastening points for connecting the base plate 8 with the door bodyshell of a motor vehicle door. The rigid region 80 of the base plate 8 thus is located between the supporting points 6 and for example serves for bearing the window lifter drive 10.

Depending on the vehicles of different vehicle manufacturers, on the vehicle types and the formation of a vehicle door, the adjustable window pane of a window lifter can be formed differently. In dependence on the shape of a vehicle door, a window pane for example can have a certain radius of curvature, which can be different in different vehicle doors and specifies a path of movement along which the window pane is moved into the door body formed of the door outer panel and the door inner panel or is moved out of the same for adjustment. In addition, the path of movement of the window panes can be formed differently and for example be moved into the door body or out of the same almost vertically or obliquely, or for avoiding obstacles in the door body or for the flush abutment of a bent, barrel-shaped window pane on the door seal be swiveled about the longitudinal vehicle axis (X-axis), transverse vehicle axis (Y-axis) or vertical vehicle axis (Z-axis) or be pivoted in planes formed by the three axes, so that as a result of these specifications the guide rails determining the path of movement of the window panes must be bent or twisted correspondingly in their longitudinal extension.

Figure 41:
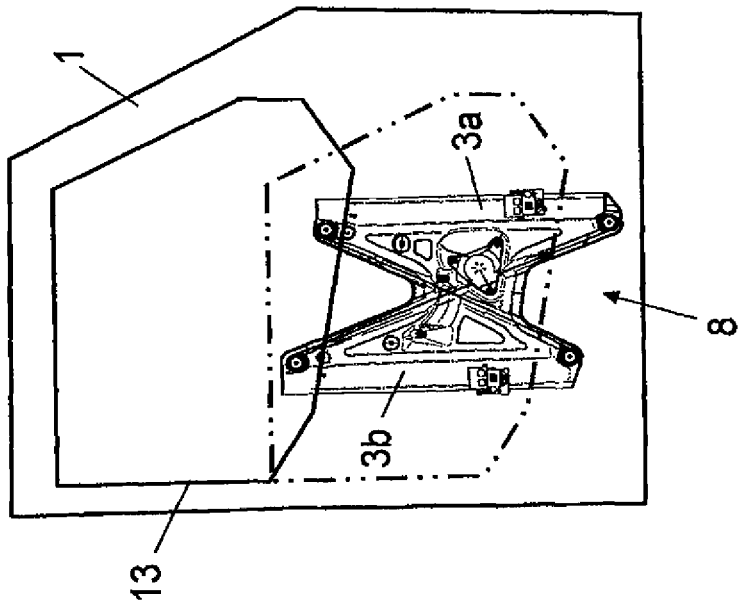
FIGS. 40 and 41 show schematic views of a vehicle door with an arrangement of the base plate as shown in FIG. 1 for various pull-off angles of the window pane of a window lifter.
Figure 40:
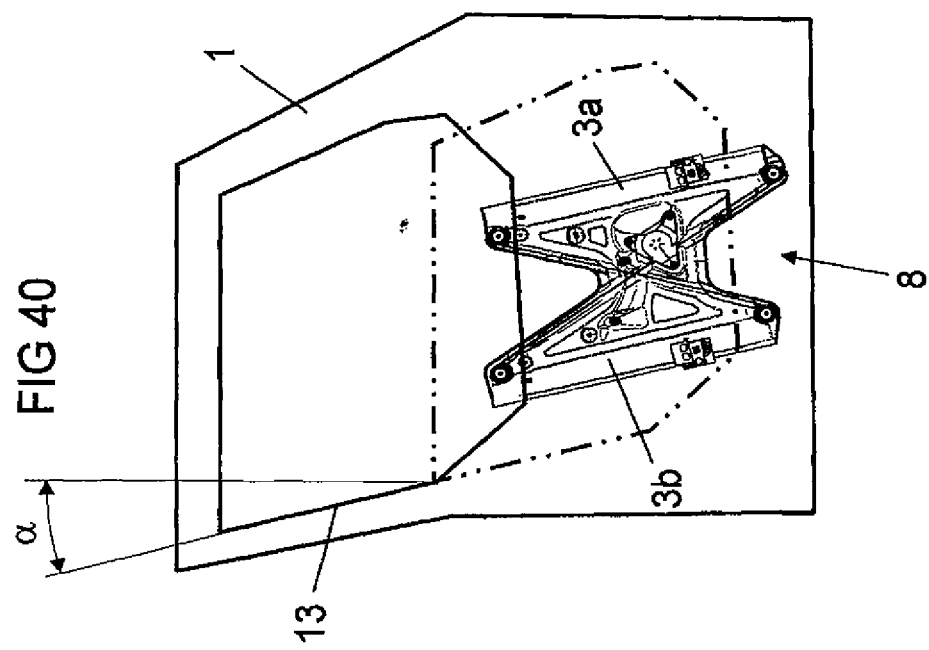

FIGS. 40 and 41 show a schematic view of a vehicle door 1 in whose door bodyshell a base plate 8 as shown in FIG. 39 is incorporated for realizing various pull-off angles α of a window pane 13 of a window lifter. Depending on the required pull-off angle α of the window pane, the base plate 8 is rotated into the respectively correct position, i.e. with an oblique pull-off of the window pane the base plate 8 as shown in FIG. 40 is mounted with an inclination at a pull-off angle α with respect to the vertical vehicle axis or z-axis, whereas with a vertical pull-off of the window pane 13 the base plate 8 as shown in FIG. 41 is connected with the door bodyshell of the vehicle door with a vertical alignment of the guide rails 3a and 3b integrated into the base plate.

FIG. 42 shows a schematic view of the base plate 8 of FIG. 39 with guide rails 3a, 3b integrated into the base plate 8 in relation to a coordinate system, reference being made to the above description of FIG. 39 with respect to the reference numerals used.

For bending or twisting the guide rails 3a, 3b when mounting the base plate 8 into the door bodyshell of a vehicle door, the diagonal struts 81 to 84 include flexible regions 9. While the rigid region 80 of the base plate 8 in the middle region of the base plate 8 on the one hand is directly connected with the one guide rail 3a, the connection with the other guide rail 3b is effected via the rigid diagonal strut 85, which is connected with the middle region of the guide rail 3b.

In an alternative embodiment, FIG. 43 shows a base plate 8 with integrated guide rails 3a, 3b, like in FIG. 42, but with an arrangement of flexible regions on transverse struts 86, 87 extending above and below the rigid middle region, which connects the middle regions of both guide rails 3a, 3b.

Figure 44:
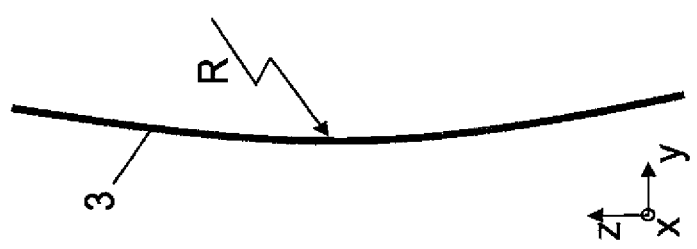
FIG. 44 shows a schematic longitudinal section through a pre-bent guide rail in the unbraced condition before mounting in a vehicle door.

FIG. 44 shows a schematic longitudinal section through one or both guide rails 3 (3a, 3b as shown in FIGS. 42 and 43) integrated into the base plate 8 in the unbraced condition before mounting into a vehicle door in relation to a system of coordinates, with the guide rail 3 being pre-bent with a radius R. When mounting the base plate 8 into a vehicle door and connecting the fastening points 5 with the door bodyshell with the supporting points 6 resting on corresponding add-on parts of the vehicle door, the guide rail 3 is brought into a constrained position, which results in the desired rail radius.

Figure 45:
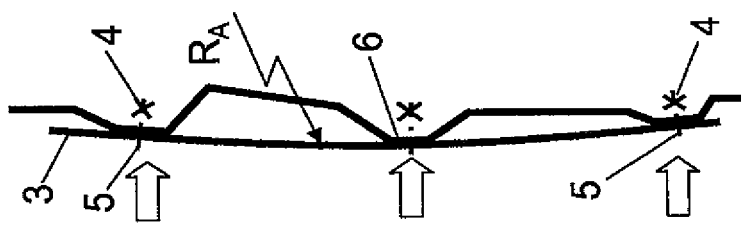
FIG. 45 shows a schematic longitudinal section through the guide rail bent back during connection with the door bodyshell of the vehicle door as shown in FIG. 44.

FIG. 45 shows the guide rail 3 after connecting the fastening points 5 with the fastening receptacles 4 of the door bodyshell and supporting the guide rail 3 on the supporting point 6, so that the pre-bent guide rail 3 is "bent up" to a radius $R_A$, with $R_A > R$.

Figure 46:
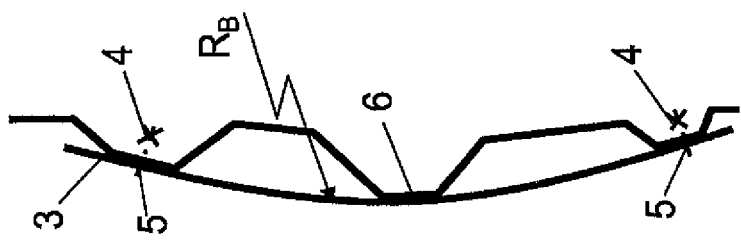
FIG. 46 shows a schematic longitudinal section through the guide rail bent further during connection with the door bodyshell of the vehicle door as shown in FIG. 44.

Alternatively, when mounting the base plate 8 into a vehicle door and attaching the fastening points 5 to corresponding fastening receptacles 4 of the door bodyshell and supporting the guide rail 3 on a supporting point 6, the guide rail 3 of FIG. 46 can be "bent further" to a radius $R_B$, i.e. $R_B < R$.

These two schematic representations of FIGS. 45 and 46 clearly show that one and the same pre-bent, flexible guide rail 3 integrated into the base plate 8 with flexible regions 9 assumes different configurations when mounted in different vehicle doors, when the base plate 8 is connected with the door bodyshell of a vehicle door, so that the base plate 8 with the integrated guide rails 3 is suitable for different pull-off kinematics and configurations of window lifters.

Figure 47:
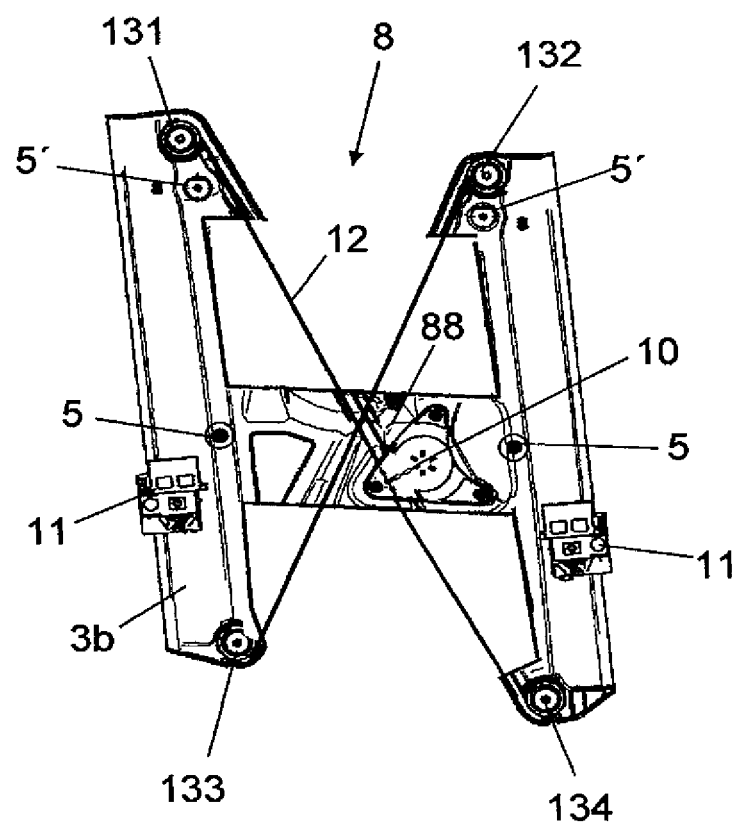
FIG. 47 shows a schematic view of a base plate with a rigid cross-beam and integrated, flexible guide rails.

The variant schematically illustrated in FIG. 47 of a base plate 8' with integrated flexible guide rails 3a, 3b, which preferably are bendable about the longitudinal vehicle axis or x-axis and twistable about the vertical vehicle axis or z-axis, includes no transverse or diagonal struts like the above-described embodiment of FIG. 42 or 43, but establishes the flexibility for twisting the guide rails 3a, 3b relative to each other, in that only one rigid cross-beam 88 is provided between the guide rails 3a, 3b, which is connected with the door bodyshell of a vehicle door via fastening points 5. By omitting the transverse or diagonal struts a flexibility of the base plate 8 is obtained, which provides for twisting the guide rails 3a, 3b relative to each other. For the further connection of the base plate 8 to the door bodyshell of a vehicle door, further fastening points such as the connection via the axles of the deflection pulleys 131-134 or additionally arranged fastening points 5' can be provided.

With reference to a side view of a vehicle door 1 as shown in FIG. 48 with a base plate 8 with integrated guide rails 3a, 3b mounted in the door bodyshell and with reference to longitudinal sections shown in FIGS. 49 and 50 through the vehicle door 1 of FIG. 48 along the sectional line A-A, the possibility of a multi-point support for internal and external window lifters will be explained in detail.

FIG. 48 shows a vehicle door 1 with a substantially rectangular opening 1d provided in the door bodyshell, into which two lateral projections 1e, 1f protrude. The base plate 8 mounted into the door bodyshell for an oblique pull-off of the window pane at a pull-off angle with respect to the vertical vehicle axis is connected with the door bodyshell via fastening points 5 which are put through the axles of the deflection pulleys of the window lifter. For establishing a specified bend or twist of the guide rails 3a, 3b integrated into the base plate 8, supporting points 6 are provided in the region of the projections 1e, 1f, which provide for a selective bending and/or twisting of the guide rails 3a, 3b integrated into the base plate 8.

In an internal window lifter system shown in FIG. 49 in a longitudinal section, the base plate 8 is connected with the door inner panel 1b of the door body by fastening means put through the deflection pulleys and is supported on the supporting points 6 provided at the projections 1e, 1f, so that the guide rails assume a bent and possibly twisted shape, whereby the window pane 13 is adjusted along a specified pull-off path.

In an external window lifter system shown in FIG. 50 in a longitudinal section through the vehicle door, the base plate 8 is attached to parts of the door bodyshell provided adjacent to the door outer skin 1a and for example can support on a side impact carrier 1g.

As an alternative to the support of the base plate 8 on supports of the projections 1e, 1f, a reinforcement element not shown in FIG. 50 can be used in an internal window lifter system for supporting the base plate 8, which in particular is connected with the door inner panel.

Figure 53:
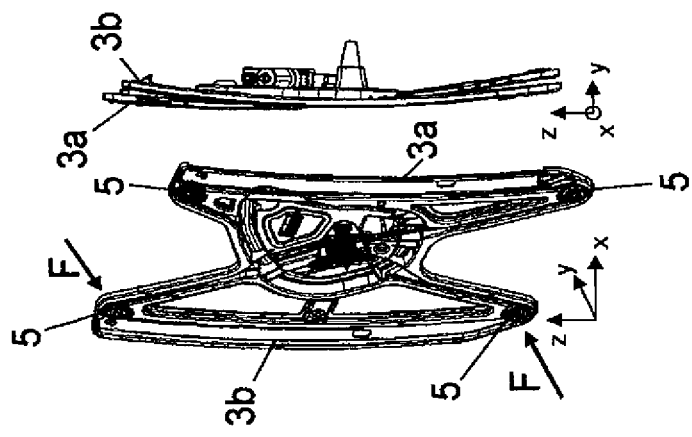
FIG. 53 shows a schematic top view and side view of the base plate of FIG. 51 after connection with the door bodyshell of a vehicle door with guide rails tilted or twisted in opposite directions.
Figure 52:
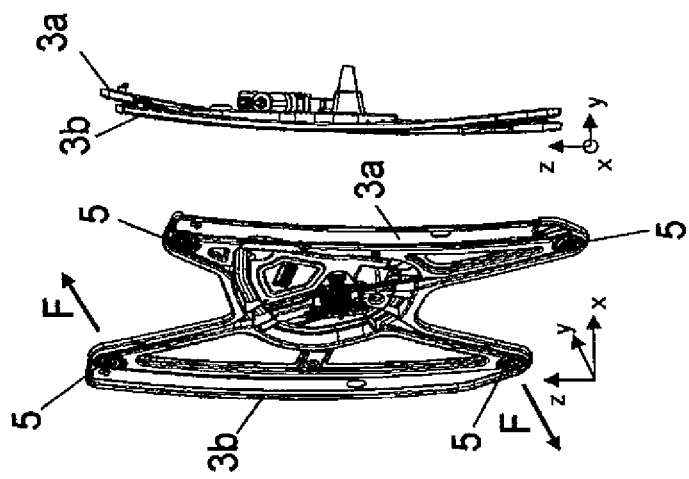
FIG. 52 shows a schematic top view and side view of the base plate of FIG. 51 after connection with the door bodyshell of a vehicle door and guide rails tilted or twisted against each other.
Figure 51:
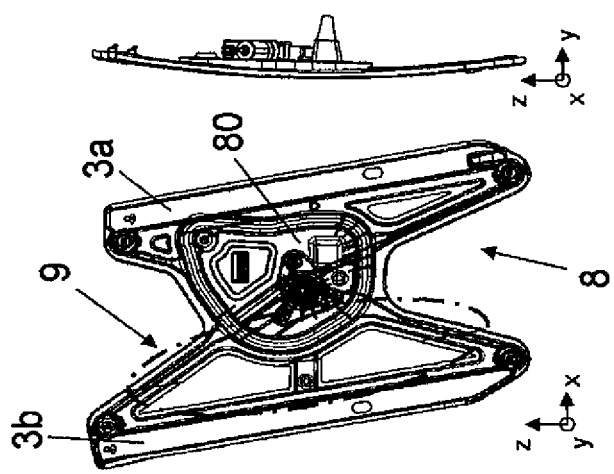
FIG. 51 shows a schematic top view and side view of a base plate in the unbraced condition.

With reference to FIGS. 51 to 53 it will be described how a guide rail is brought into a constrained position by connection with the door bodyshell of a vehicle door and thereby is twisted or tilted.

FIG. 51 shows a top view and a side view with a system of coordinates for illustrating the mounting position of a base plate 8 with a guide rail 3a integrated into the base plate 8, the so-called A-rail, and a guide rail 3b integrated into the base plate 8, the so-called B-rail, in a starting situation. By arranging a flexible region 9 in the base plate 8, for example by a corresponding design of the rigid region 80 of the base plate 8 and diagonal struts extending from the rigid region 80 to the upper and lower ends and to the middle region of the B-rail 3b with flexible regions provided in the diagonal struts, the B-rail 3b can be bent and/or twisted, whereas the A-rail 3a is connected with the door bodyshell in its form present in the starting situation.

The side view of FIG. 51 illustrates that in the starting situation both guide rails 3a, 3b are aligned with each other in direction of the longitudinal vehicle axis or x-axis.

After connecting the A-rail 3a with the door bodyshell at the fastening points 5 at the upper and lower deflection pulleys of the A-rail 3a, a force is applied onto the ends of the B-rail in direction of the depicted arrows F and the B-rail for example is connected with the door bodyshell by means of screw bolts put through the axles of the deflection pulleys serving as fastening points 5 at the upper and lower ends of the B-rail 3b and hence brought into a constrained position, in which it is rotated or tilted relative to the A-rail 3a, as is illustrated in the side view of FIG. 52.

FIG. 53 shows that the flexible B-rail 3b is rotated or tilted in opposite direction by a reversal of the forces F acting onto the ends of the B-rail 3b, as is illustrated by the side view of FIG. 53.

In an analogous application of a pre-bent guide rail, the constrained position of the B-rail as shown for example in FIG. 52 can exist as starting position after connecting the fastening points 5 at the door bodyshell of a vehicle door, in order to further bend up or bend back the B-rail 3b after connecting the A-rail 3a with the door bodyshell when connecting the fastening points 5 of the B-rail 3b with the door bodyshell, so that the B-rail 3b is rotated or tilted more or less relative to the A-rail 3a.

Figure 55:
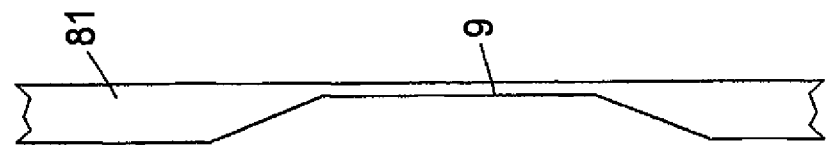
FIG. 55 shows a section through a diagonal strut along the sectional line A-A of FIG. 54.
Figure 54:
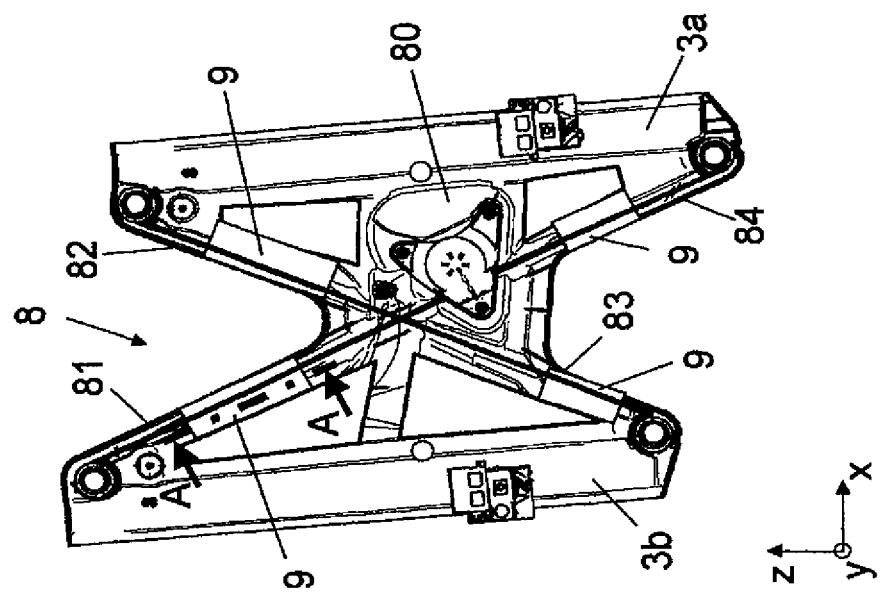
FIG. 54 shows a schematic view of a base plate with rigid middle region and flexible regions in diagonal struts of the connecting portions corresponding to FIG. 42.

With reference to FIGS. 54 to 56 various possibilities for achieving the flexibility in the base plate of a window lifter system necessary for twisting or bending a guide rail will be set forth and explained.

As described above, the flexible regions provided in the base plate serve to permit or provide for a bending and/or twisting of the guide rails integrated into the base plate and/or a torsion of the guide rails relative to each other. To explain these possibilities, reference is made to a base plate with flexible regions in diagonal struts of the base plate according to FIG. 42 with associated description. The possibilities described below for establishing the required flexibility are of course also applicable to an arrangement of the flexible regions in the transverse struts above and below the rigid region of the base plate.

The schematic views of a base plate 8 with integrated guide rails 3a, 3b and flexible regions 9 as well as rigid regions 80 as shown in FIGS. 54 and 56 correspond to the representation of FIG. 42 and merely serve the identification of the sectional lines for explaining the subsequently described variants for forming flexible regions on the base plate 8.

The longitudinal section shown in FIG. 55 through the connecting strut 81 along the sectional line A-A of FIG. 54 schematically shows the production of the required flexibility by thinning out the material of the connecting or diagonal strut 81 as compared to the rigid regions of the diagonal strut 81, so that when using the same material a flexible region 9 is created by a lower moment of resistance.

In a section along sectional line B-B of FIG. 56, FIG. 57 shows the possibility of producing a flexible region 9 in the diagonal strut 81 by a planar or flat design of the flexible region 9 or by using a cross-section with a low moment of resistance. Another possibility for example consists in providing a U-section with closely spaced legs of the U-section in the flexible region, whereas the remaining rigid region of the diagonal strut 81 is formed of a U-section with legs spaced at a greater distance from each other and hence with a higher moment of resistance.

Another possibility for producing flexible regions or portions in a base plate 8 with integrated guide rails is given by the combination of the two possibilities described above, in that in the flexible region 9 of a diagonal or transverse strut 81-87 the material both is thinned out and designed flat or "weakened" by using a cross-section with a low moment of resistance.

Figure 58:
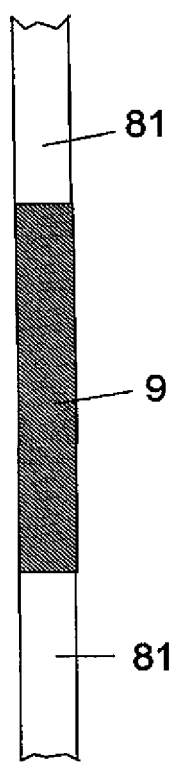
FIG. 58 shows a section through a diagonal strut with a flexible region made of a flexible material along the sectional line A-A of FIG. 54.

In a section along sectional line A-A of FIG. 54, FIG. 58 illustrates the possibility of producing a flexible portion 9 in the diagonal strut 81 by employing a 2-component technique, in that the rigid region of the diagonal strut 81 made of a first component, consisting of a rigid material, for example a long glass fiber-reinforced plastic material, such as polypropylene LFG30 is used, while the flexible region 9 is produced by a second component of a flexible material, for example a thermoplastic elastomer (TPE) or as variant of a material with a low modulus of elasticity, such as non-reinforced polypropylene. It is a prerequisite for this kind of creating flexible regions or portions in a base plate 8 with integrated guide rails that the plastic materials used for the 2-component technique are compatible with each other.

By combining the 2-component technique with the possibility of producing the required flexibility by a flat design of the flexible regions or portions or by using cross-sections with low moments of resistance, a further possibility for creating flexible regions or portions in the struts 81-87 is given.

Figure 62:
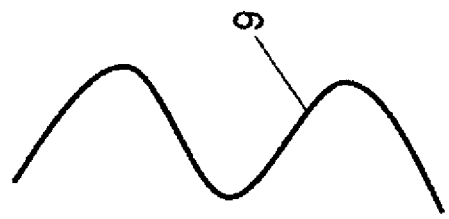
FIG. 62 shows a section through the wave-like structure along the sectional line A-A of FIG. 61.
Figure 61:
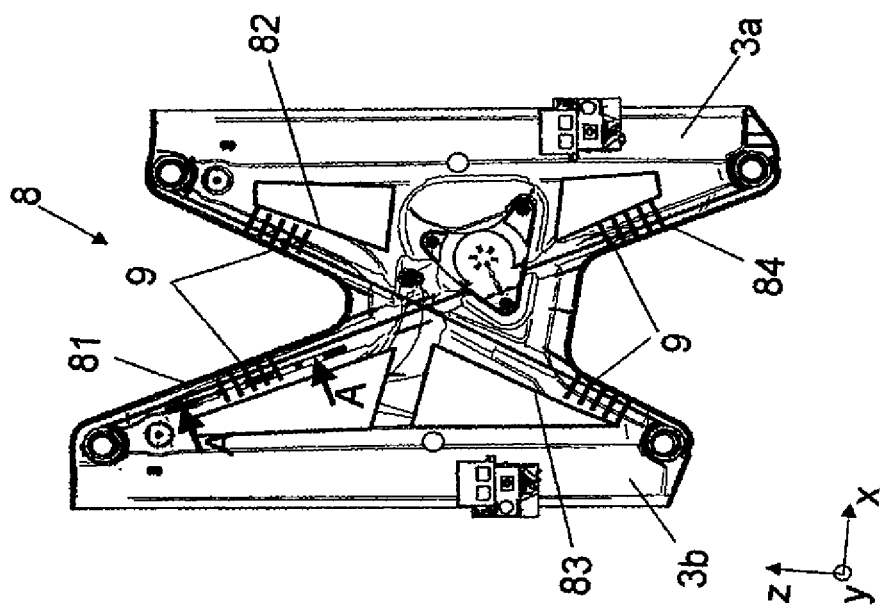
FIG. 61 shows a schematic view of a base plate with integrated guide rails and a wave-like structure of the diagonal struts.

In FIGS. 61 and 62, the principle of the production of a flexible portion in a connecting strut by the spring action of a wave-like design of the flexible region 9 is schematically shown in a top view of a base plate 8 with integrated guide rails and in a section along the sectional line A-A of FIG. 61 as represented in FIG. 62. The term "wave-like design" in this connection refers to the fact that by undulation more material is provided on the same length, with the direction of the undulation, i.e. the orientation of the crests and troughs of the waveform, specifying the direction of the flexibility.

In the orientation of the wave-like design of the flexible region 9, which is schematically shown in FIG. 61, the flexibility is increased vertical to the orientation of the diagonal struts 81-84, so that a different twisting and bending of the guide rails 3a and 3b relative to each other and connecting the guide rails 3a, 3b to each other is possible.

According to the schematic representation in FIG. 63, the wave-like design alternatively can be made for producing a flexible region in direction of the vertical vehicle axis or z-axis, whereby bending of the guide rails 3a, 3b about the longitudinal vehicle axis or x-axis becomes possible.

According to the schematic diagram shown in FIG. 64, a wave-like design of the flexible region alternatively can be provided with an orientation vertical to the orientation of the waveform as shown in FIG. 63, which provides for bending about the vertical vehicle axis or z-axis.

Figure 65:
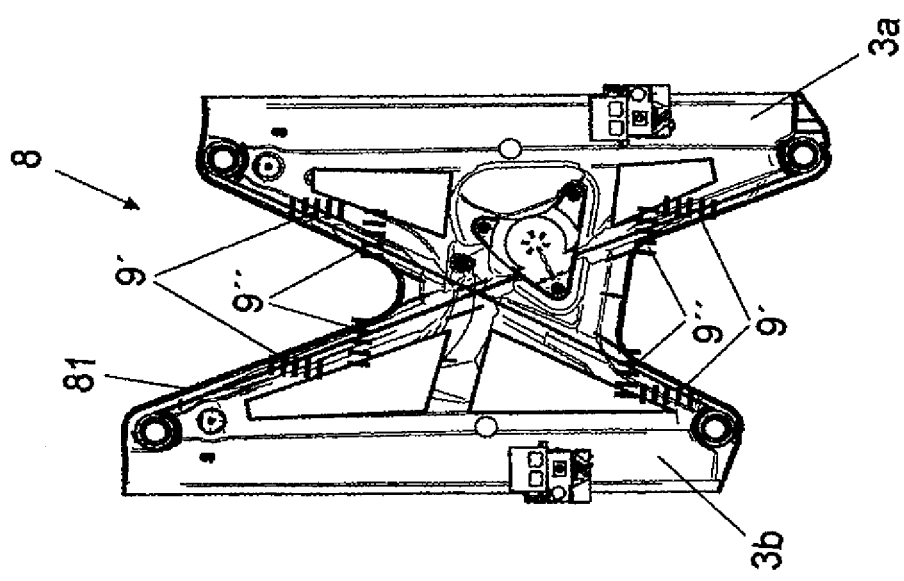
FIG. 65 shows a schematic view of a base plate with integrated guide rails with a wave-like structure for a flexible region for bending the guide rails about the longitudinal vehicle axis and vertical vehicle axis.

Even with a wave-like design of the material for producing a flexible region or portion in a diagonal or transverse strut of the base plate 8 with integrated guide rails 3a, 3b a combination of the two orientations of the waveform described above is possible, as is schematically indicated in FIG. 65 by the strokes corresponding to the wave crests and troughs, respectively. In this embodiment, a flexible region 9' is created for bending the guide rails 3a, 3b about the longitudinal vehicle axis or x-axis and a flexible region 9" is created for creating a flexible region for bending about the vertical vehicle axis or z-axis.

The possibility created by the solution according to the invention of providing individual or a small range of prefabricated guide rails or base plates with integrated guide rails or assembly carriers with integrated guide rails for different vehicles and vehicle types of different vehicle manufacturers and hence ensure an economic fabrication of guide rails and base plates or assembly carriers can even be increased in that according to FIGS. 66 to 70 mounting frames with variable guide rails are provided, i.e. guide rails which are separately connectable with the mounting frame for a use across all model ranges.

FIG. 66 shows a schematic top view and FIG. 67 shows a section along sectional line A-A of FIG. 66 of a mounting frame 8' which analogous to the above-described base plates 8 includes a middle rigid region 80' and diagonal struts 81', 82', 83' and 84' with flexible portions proceeding from the rigid region 80'. The ends of the diagonal struts 81' to 84' merge into angled legs 91 to 94, in which variable links 95 to 98 are provided for mounting guide rails 3a, 3b, which at the same time are provided as fastening points 5 for connecting the mounting frame 8' with the guide rails 3a, 3b joined to the mounting frame 8' with a door bodyshell. Additional supporting points 6 on one or both guide rails 3a, 3b can be provided for the selective deformation, i.e. twisting or bending of one or both guide rails 3a, 3b.

In a schematic longitudinal section, FIG. 67 shows the attachment and connection of the mounting frame 8' with the guide rails 3a, 3b connected with the mounting frame 8' to the door bodyshell of a vehicle door 1, in that the mounting frame 8' together with the guide rails 3a, 3b previously connected with the mounting frame 8' is attached to the door bodyshell 1 and connected with the door bodyshell by means of the fastening points 5, wherein the supporting point 6, for example a side impact carrier integrated into the door bodyshell, is effective as supporting point, in order to achieve a specified bend and/or twist of the guide rails 3a, 3b or of one of the two guide rails 3a, 3b.

The schematic representations of FIGS. 68 to 70 show the variable use of the mounting frame 8' shown in FIG. 66 in a schematic top view, in that the same mounting frame 8' is provided for different vehicle doors and pull-off kinematics of window lifter units, which merely is connected with guide rails 3a, 3b of different lengths. The connection of the guide rails 3a, 3b with corresponding links 95 to 98 at the angled legs 91 to 94 provides for different distances between the guide rails 3a, 3b and different pull-off angles of the guide rails 3a, 3b.

Corresponding to the schematic representations of FIGS. 68 and 69, different adjustment paths and adjustment directions of window panes can be realized via different lengths of the guide rails 3a, 3b and different distances of the guide rails 3a, 3b to each other.

A comparison of the schematic representations of FIGS. 69 to 70 shows that by connecting the separate guide rails 3a, 3b with the mounting frame 8' at different points of the angled legs 91 to 94 different pull-off angles can be realized, in order to realize different pull-offs of window panes in different vehicle doors.

The invention claimed is:

1. A method for assembling a window lifter of a motor vehicle, wherein the window lifter comprises a bent guide rail on which a driver to be coupled with a window pane is shiftably mounted, said guide rail including fastening points which are braceable with fastening receptacles of a carrier element, the method comprising:
   a) providing at least one supporting point or additional fastening point between the fastening receptacles of the carrier element,
   b) placing the guide rail pre-bent with a first bending radius on the fastening receptacles and the supporting point or additional fastening point,
   c) attaching the guide rail at the fastening points of the guide rail to the fastening receptacles of the carrier element, and
   d) fastening the pre-bent guide rail to the fastening receptacles of the carrier element while supporting the guide rail on the supporting point or additional fastening point such that the pre-bent guide rail is bent up to a second bending radius, which is greater than the first bending radius, or straightened.

2. A method for assembling a window lifter of a motor vehicle, wherein the window lifter comprises a base plate into which at least two bendable or twistable guide rails are integrated for guiding a driver to be coupled with a window pane along an adjustment direction and which includes first fastening points which are connectable with fastening receptacles of a vehicle door, the method comprising:
   a) connecting the first fastening points of the base plate with the fastening receptacles of the vehicle door,
   b) connecting the guide rail with a rigid region of the base plate via connecting portions, and
   c) effecting a twist or bend of the guide rail by connecting middle regions of the at least two bendable or twistable guide rails of the base plate with each other via second fastening points located at opposing ends of a comparatively rigid cross-beam.

3. The method of claim 2, wherein the guide rail is bent about a longitudinal vehicle axis or twisted about a vertical vehicle axis.

4. The method of claim 3, wherein the connecting portions are formed as struts which are connected with the ends and a middle portion of the guide rails.

5. The method of claim 2, wherein the rigid region of the base plate is arranged between the at least two flexible or twistable guide rails, wherein the first fastening points are provided at respective ends of the guide rails and at least one supporting point or further fastening point is provided between the first fastening points at the respective ends of the guide rails, and wherein at least one of the first fastening points is provided at an axle of a deflection pulley of the window lifter for guiding and deflecting a window lifter cable.

6. The method of claim 5, wherein the at least one supporting point comprises a component integrated into a door bodyshell of the vehicle door, wherein diagonal struts connected with ends of the at least two bendable or twistable guide rails contain flexible regions.

7. A method for assembling a window lifter of a motor vehicle, wherein the window lifter comprises a base plate into which at least one bendable or twistable guide rail is integrated for guiding a driver to be coupled with a window pane along an adjustment direction and which includes fastening points which are connectable with fastening receptacles of a vehicle door, the method comprising:
   a) connecting the fastening points of the base plate with the fastening receptacles of the vehicle door,
   b) connecting the at least one guide rail with a rigid region of the base plate via connecting portions,
   c) effecting a twist or bend of the at least one guide rail by deforming a flexible region of at least one of the connecting portions.

8. The method of claim 7, wherein the flexible region of the at least one connecting portions is formed of a reduction of a cross-section as compared to a cross-section of a rigid region of the at least one connecting portions or wherein the flexible region of the at least one connecting portion comprises a cross-sectional shape having a lower moment of resistance than a cross-sectional shape of the rigid region.

9. The method of claim 7, wherein at least one of a rigid region of the base plate and a rigid region of the connecting portions is made of a rigid material, and the flexible region is made of a less rigid or a flexible material.

10. The method of claim 7, wherein the base plate comprises a mounting frame comprising said connecting portions, wherein articulations are located at end regions of said connection portions, the articulations being configured for accommodating other guide rails of different window lifters and vehicle doors, and wherein the mounting frame is formed X-shaped with a rigid middle region and four diagonal struts proceeding diagonally from the rigid middle region, wherein angled end regions of the diagonal struts include variable articulations configured for accommodating the other guide rails.

* * * * *